(12) United States Patent
Jang et al.

(10) Patent No.: US 12,092,924 B2
(45) Date of Patent: Sep. 17, 2024

(54) DISPLAY APPARATUS

(71) Applicant: SAMSUNG ELECTRONICS CO., LTD., Suwon-si (KR)

(72) Inventors: Hyukjun Jang, Suwon-si (KR); Sungyeol Kim, Suwon-si (KR); Hyungsuk Kim, Suwon-si (KR); Youngmin Lee, Suwon-si (KR); Junsung Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/516,379

(22) Filed: Nov. 21, 2023

(65) Prior Publication Data
US 2024/0248345 A1    Jul. 25, 2024

Related U.S. Application Data

(63) Continuation of application No. PCT/KR2023/017836, filed on Nov. 8, 2023.

(30) Foreign Application Priority Data

Jan. 19, 2023 (KR) ................. 10-2023-0008331

(51) Int. Cl.
*G02F 1/13357*    (2006.01)
*G09G 3/36*    (2006.01)

(52) U.S. Cl.
CPC .. *G02F 1/133603* (2013.01); *G02F 1/133611* (2013.01); *G09G 3/3677* (2013.01); *G09G 3/3688* (2013.01); *G09G 2320/0233* (2013.01)

(58) Field of Classification Search
CPC ......... G02F 1/133603; G02F 1/133611; G09G 3/3677; G09G 3/3688; G09G 2320/0233

(Continued)

(56) References Cited

U.S. PATENT DOCUMENTS 6,407,795 B1    6/2002  Kamizono et al.
8,300,195 B2   10/2012  Hwang et al.
(Continued)

FOREIGN PATENT DOCUMENTS

CN    215340620 U    12/2021
JP    2019-40874 A    3/2019
(Continued)

OTHER PUBLICATIONS

International Search Report (PCT/ISA/210) issued by the International Searching Authority on Feb. 27, 2024 in corresponding International Application No. PCT/KR2023/017836.

(Continued)

*Primary Examiner* — Charles S Chang
(74) *Attorney, Agent, or Firm* — Sughrue Mion, PLLC

(57) ABSTRACT

A display apparatus includes: a display panel; and a light source device configured to provide light to the display panel, wherein the light source device may include: an optical member; a substrate including a first side facing the display panel and the optical member; a light source provided on the first side of the substrate; a driving element provided on the first side of the substrate and configured to drive the light source; a plurality of lines provided on the first side of the substrate, the plurality of lines including a first line and a second line that is connected to the driving element; and a jumper supporter provided on the first side of the substrate in an area where the first line intersects the second line, the jumper supporter being configured to support the optical member, to electrically connect the first line, and to guide the second line to be spaced apart from the first line.

20 Claims, 22 Drawing Sheets

(58) Field of Classification Search
USPC .................................................... 349/58–68
See application file for complete search history.

(56) References Cited

U.S. PATENT DOCUMENTS

| | | | | |
|---|---|---|---|---|
| 2012/0087126 A1* | 4/2012 | Takeuchi | ................ | F21V 13/04 |
| | | | | 362/382 |
| 2022/0003384 A1 | 1/2022 | Lin et al. | | |
| 2024/0184169 A1 | 6/2024 | Kim et al. | | |

FOREIGN PATENT DOCUMENTS

| | | |
|---|---|---|
| JP | 2021-197356 A | 12/2021 |
| KR | 10-0397594 B1 | 9/2003 |
| KR | 10-2008-0020324 A | 3/2008 |
| KR | 10-2008-0105705 A | 12/2008 |
| KR | 10-2012-0030909 A | 3/2012 |
| KR | 10-1542883 B1 | 8/2015 |
| KR | 10-2017-0024937 A | 3/2017 |
| KR | 10-2018-0062224 A | 6/2018 |
| KR | 10-1923479 B1 | 11/2018 |
| KR | 10-2024-0083678 A | 6/2024 |

OTHER PUBLICATIONS

Written Opinion (PCT/ISA/237) issued by the International Searching Authority on Feb. 27, 2024 in corresponding International Application No. PCT/KR2023/017836.

\* cited by examiner

DISPLAY APPARATUS

CROSS-REFERENCE TO RELATED APPLICATIONS

This application is a by-pass continuation of International Application No. PCT/KR2023/017836, filed on Nov. 8, 2023, which is based on and claims priority to Korean Patent Application No. 10-2023-0008331, filed on Jan. 19, 2023, in the Korean Intellectual Property Office, the disclosures of which are incorporated by reference herein in their entireties.

BACKGROUND

1. Field

The present disclosure relates to a display apparatus including an optical member and a supporter.

2. Description of Related Art

A display apparatus converts obtained or stored electrical information into visual information and displays the visual information on a screen.

Display apparatuses include a monitor apparatus connected to a personal computer or a server computer, a portable computer device, a navigation terminal device, a general television apparatus, an Internet Protocol television (IPTV), a portable terminal device, such as a smart phone, a tablet PC, a personal digital assistant (PDA) or a cellular phone, various display apparatuses used to reproduce images, such as advertisements or movies in an industrial field, or various kinds of audio/video systems.

The display apparatus (whether a self-luminous display or a non-luminous display) includes a light source device to convert electrical information into visual information, and the light source device includes a plurality of light sources configured to independently emit light. Each of the plurality of light sources includes a light emitting diode (LED) or an organic light emitting diode (OLED).

Driving elements and light sources (e.g., light emitting diodes) may be fixed on a light source substrate using a surface mount technology (SMT). In addition, lines (wires) that connect the driving elements and the light sources to exchange electrical signals may be wired to the light source substrate, and a supporter that supports an optical member provided to improve optical characteristics of the light source device may be disposed on the light source substrate.

The substrate may include two outer surfaces. An outer surface of the substrate on which the light source and driving elements are mounted is different from an outer surface of the substrate on which connectors and capacitors are mounted, and accordingly, there is a demand to increase process efficiency when manufacturing light source devices. In other words, there has been a demand for single-sided printed circuit board (PCB)s.

SUMMARY

Provided is a display apparatus that may improve an efficiency of a production process.

Further, provided is a display apparatus which may have reduced production costs.

According to an aspect of the disclosure, a display apparatus includes: a display panel: and a light source device configured to provide light to the display panel, wherein the light source device may include: an optical member: a substrate including a first side facing the display panel and the optical member: a light source provided on the first side of the substrate: a driving element provided on the first side of the substrate and configured to drive the light source: a plurality of lines provided on the first side of the substrate, the plurality of lines including a first line and a second line that are connected to the driving element: and a jumper supporter provided on the first side of the substrate in an area where the first line intersects the second line, the jumper supporter being configured to support the optical member, to electrically connect the first line, and to guide the second line to be spaced apart from the first line.

The substrate may include: an insulation layer including a first side facing the optical member: and a conduction layer laminated on the first side of the insulation layer and including a first side facing the optical member, and the jumper supporter may be soldered to the first side of the conduction layer to electrically connect the first line.

The jumper supporter may include: a base provided on the conduction layer: a support portion protruded from the base and configured to support the optical member; and a connection portion provided on the base to electrically connect the first line.

The first line may include: a first portion: and a second portion disconnected from the first portion, and the connection portion of the jumper supporter connects the first portion and the second portion.

The second line may be between the insulation layer and the base of the jumper supporter.

The plurality of lines may further include: a scan line configured to provide a scan signal to the driving element: a data line configured to provide a data signal to the driving element: a power line configured to provide a power signal to the light source; and an out line configured to provide a signal from the driving element to the light source.

The jumper supporter may be a first jumper supporter provided in an area where the scan line intersects the data line.

The first line may be the scan line; and the second line may be the data line.

The light source device may further include a second jumper supporter provided in an area where the power line intersects the scan line.

The scan line may be electrically connected by the second jumper supporter; and the power line may be spaced apart from the scan line by the second jumper supporter.

The light source device may further include a third jumper supporter provided in an area where the power line intersects the data line.

The data line may be electrically connected by the third jumper supporter: and the power line may be spaced apart from the data line by the third jumper supporter.

The light source device may further include a fourth jumper supporter provided in an area where the out line intersects at least one of the data line, the scan line and the power line.

The out line may be electrically connected by the fourth jumper supporter; and at least one of the data line, the scan line and the power line may be spaced apart from the out line by the fourth jumper supporter.

The display apparatus may further include a dimming driver configured to transmit the scan signal, the data signal, and the power signal to the driving element, the driving element may include a first driving element and a second driving element, and the first driving element and the second driving element are respectively configured to receive the scan signal, the data signal, and the power signal from the dimming driver, the scan line may include a first scan line connected to the first driving element and a second scan line connected to the second driving element, the data line may include a first data line connected to the first driving element and a second data line connected to the second driving element, and the jumper supporter may be provided in an area where at least one of the first scan line and the first data line intersects at least one of the second scan line and the second data line.

According to an aspect of the disclosure, a light source device includes: an optical member: a substrate including a first side facing the optical member; a light source provided on the first side of the substrate; a driving element provided on the first side of the substrate and configured to drive the light source: a plurality of lines provided on the first side of the substrate, wherein the plurality of lines may include a first line and a second line that are connected to the driving element: and a jumper supporter provided on the first side of the substrate in an area where the first line intersects the second line, the jumper supporter being configured to support the optical member, to electrically connect the first line, and to guide the second line to be spaced apart from the first line.

The first line may include a first portion and a second portion, the substrate may include: an insulation layer including a first side facing the optical member; and a conduction layer laminated on the first side of the insulation layer and including a first side facing the optical member, and the jumper supporter may be electrically connected to the first side of the conduction layer and electrically connects the first portion of the first line and the second portion of the first line.

The jumper supporter may include: a base provided on the conduction layer; a support portion protruded from the base and configured to support the optical member: and a connection portion provided on the base, and the connection portion of the jumper supporter connects the first portion of the first line to the second portion of the first line.

The second line may be between the insulation layer and the base of the jumper supporter.

The plurality of lines may further include a plurality of first lines which may include the first line, each first line of the plurality of first lines may include a first portion and a second portion, the substrate may include: an insulation layer including a first side facing the optical member: and a conduction layer laminated on the first side of the insulation layer and including a first side facing the optical member, the jumper supporter may include: a base provided on the conduction layer: a support portion protruded from the base and configured to support the optical member: and a plurality of connection portions provided on the base, each connection portion of the plurality of connection portions corresponds to a respective first line of the plurality of first lines, and each connection portion of the plurality of connection portions connects the first portion and the second portion of the respective first line corresponding to the connection portion, and the jumper supporter may be further configured to guide the second line to be spaced apart from each first line of the plurality of first lines.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DISCLOSURE

Figure 1:
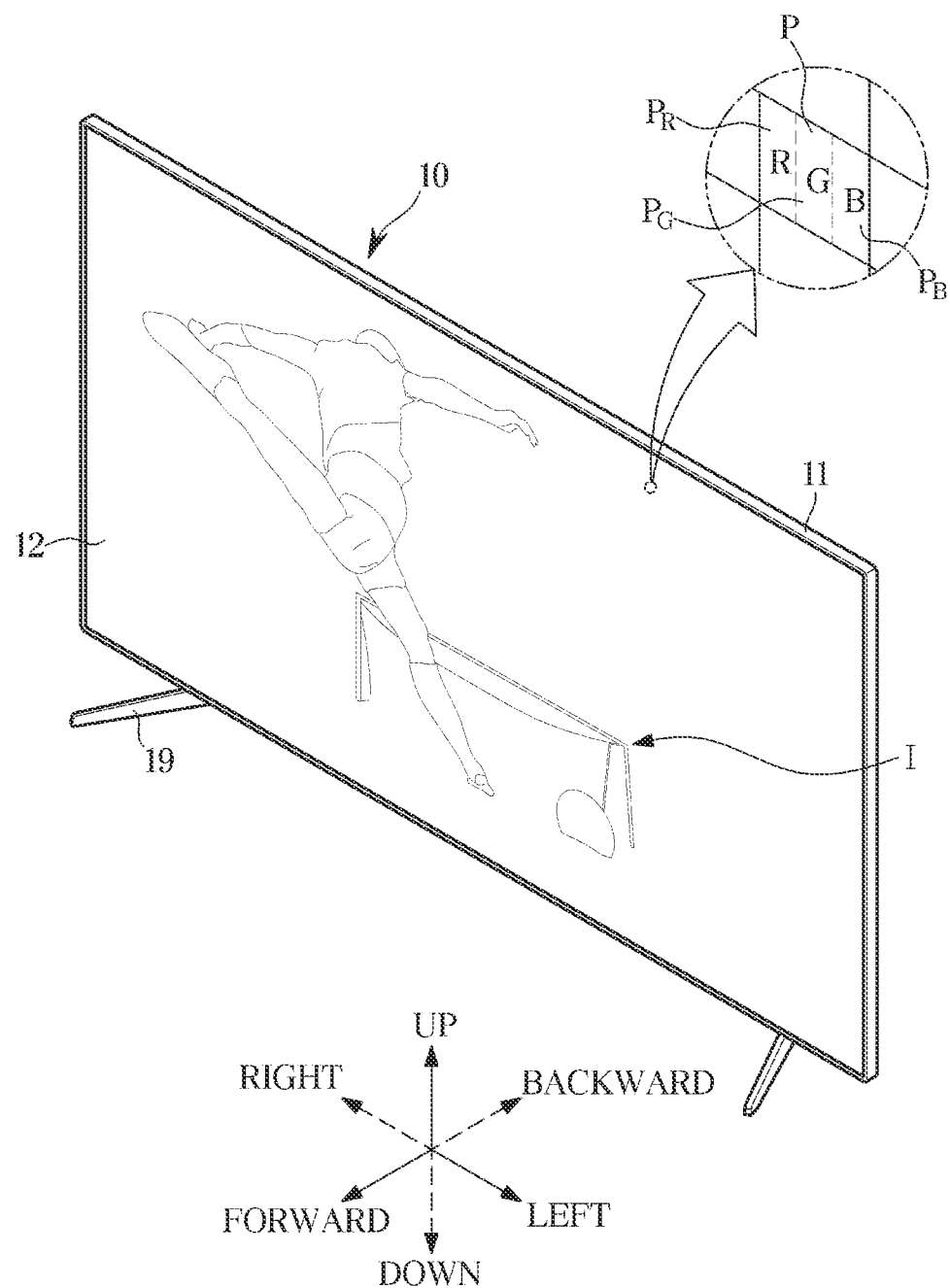
FIG. 1 is a perspective view of a display apparatus according to an embodiment.

Embodiments described in the disclosure and configurations shown in the drawings are merely examples of the embodiments of the disclosure, and may be modified in various different ways at the time of filing of the present application to replace the embodiments and drawings of the disclosure.

In addition, the same reference numerals or signs shown in the drawings of the disclosure indicate elements or components performing substantially the same function.

Also, the terms used herein are used to describe the embodiments and are not intended to limit and/or restrict the disclosure. The singular forms "a," "an" and "the" are intended to include the plural forms as well, unless the context clearly indicates otherwise. In this disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

Herein, the expression "at least one of a, b or c" indicates "only a," "only b," "only c," "both a and b," "both a and c," "both b and c," or "all of a, b, and c."

It will be understood that, although the terms first, second, third, etc., may be used herein to describe various elements, but elements are not limited by these terms. These terms are only used to distinguish one element from another element. For example, without departing from the scope of the disclosure, a first element may be termed as a second element, and a second element may be termed as a first element. The term of "and/or" includes a plurality of combinations of relevant items or any one item among a plurality of relevant items.

Additionally, in the present disclosure, the meaning of "identical" includes properties that are similar to each other or are similar within a certain range. Also, "identical" means "substantially identical". It should be understood that "substantially identical" means that values that fall within the margin of error in manufacturing or values that fall within a range that has no meaning compared to the standard value are included in the scope of "identical".

In the following description, terms such as "unit", "part", "block", "member", and "module" indicate a unit for processing at least one function or operation. For example, those terms may refer to at least one process processed by at least one hardware such as Field Programmable Gate Array (FPGA), Application Specific Integrated Circuit (ASIC), at least one software stored in a memory or a processor.

In the following detailed description, the terms of "forward", "backward", "left side", "right side" and the like may be defined by the drawings, but the shape and the location of the component is not limited by the terms.

Reference will now be made in detail to embodiments of the disclosure, examples of which are illustrated in the accompanying drawings.

FIG. 1 is a perspective view of a display apparatus according to an embodiment.

Referring to FIG. 1, a display apparatus 10 is a device that processes an image signal received from an outside and visually displays the processed image. Hereinafter, a case in which the display apparatus 10 is a television is exemplified, but embodiments of the disclosure are not limited thereto. For example, the display apparatus 10 may be implemented in various forms, such as a monitor, a portable multimedia device, and a portable communication device, and the display apparatus 10 is not limited in its shape as long as visually displaying an image.

The display apparatus 10 may be a large format display (LFD) installed outdoors, such as a roof of a building or a bus stop, but is not limited to the outside of a building. Thus, the display apparatus 10 according to an embodiment may be installed in any places as long as the display apparatus is accessed by a large number of people, even indoors, such as subway stations, shopping malls, movie theaters, companies, and stores.

The display apparatus 10 may receive content data including video signals and audio signals from various content sources and output video and audio corresponding to the video signals and the audio signals. For example, the display apparatus 10 may receive content data through a broadcast reception antenna or cable, receive content data from a content playback device, or receive content data from a content providing server of a content provider.

As illustrated in FIG. 1, the display apparatus 10 includes a body 11, and a screen 12 provided to display an image I.

The body 11 may form an appearance of the display apparatus 10, and the body 11 may include a component configured to allow the display apparatus 10 to display the image I and to perform various functions. Although the body 11 shown in FIG. 1 is in the form of a flat plate, the shape of the body 11 is not limited thereto. For example, the body 11 may have a curved plate shape.

The screen 12 may be formed on a front surface of the body 11, and display the image I. For example, the screen 12 may display a still image or a moving image. Further, the screen 12 may display a two-dimensional plane image or a three-dimensional image using binocular parallax of the user.

The screen 12 may include a display panel configured to transmit or block light emitted from a device such as a light source device.

A plurality of pixels P may be formed on the screen 12 and the image I displayed on the screen 12 may be formed by a combination of the lights emitted from the plurality of pixels P. For example, the image I may be formed on the screen 12 by combining light emitted from the plurality of pixels P as a mosaic.

Each of the plurality of pixels P may emit different brightness and different color of light. In order to emit light in the various colors, the plurality of pixels P may include sub-pixels PR, PG, and PB, respectively.

The sub-pixels PR, PG, and PB may include a red sub pixel PR emitting red light, a green sub pixel PG emitting green light, and a blue sub pixel PB emitting blue light. For example, the red light may represent a light beam having a wavelength of approximately 700 nm (nanometers, one billionth of a meter) to 800 nm, the green light may represent a light beam having a wavelength of approximately 500 nm to 600 nm, and the blue light may represent a light beam having a wavelength of approximately 400 nm to 500 nm.

By combining the red light of the red sub pixel PR, the green light of the green sub pixel PG and the blue light of the blue sub pixel PB, each of the plurality of pixels P may emit different brightness and different color of light.

Figure 2:
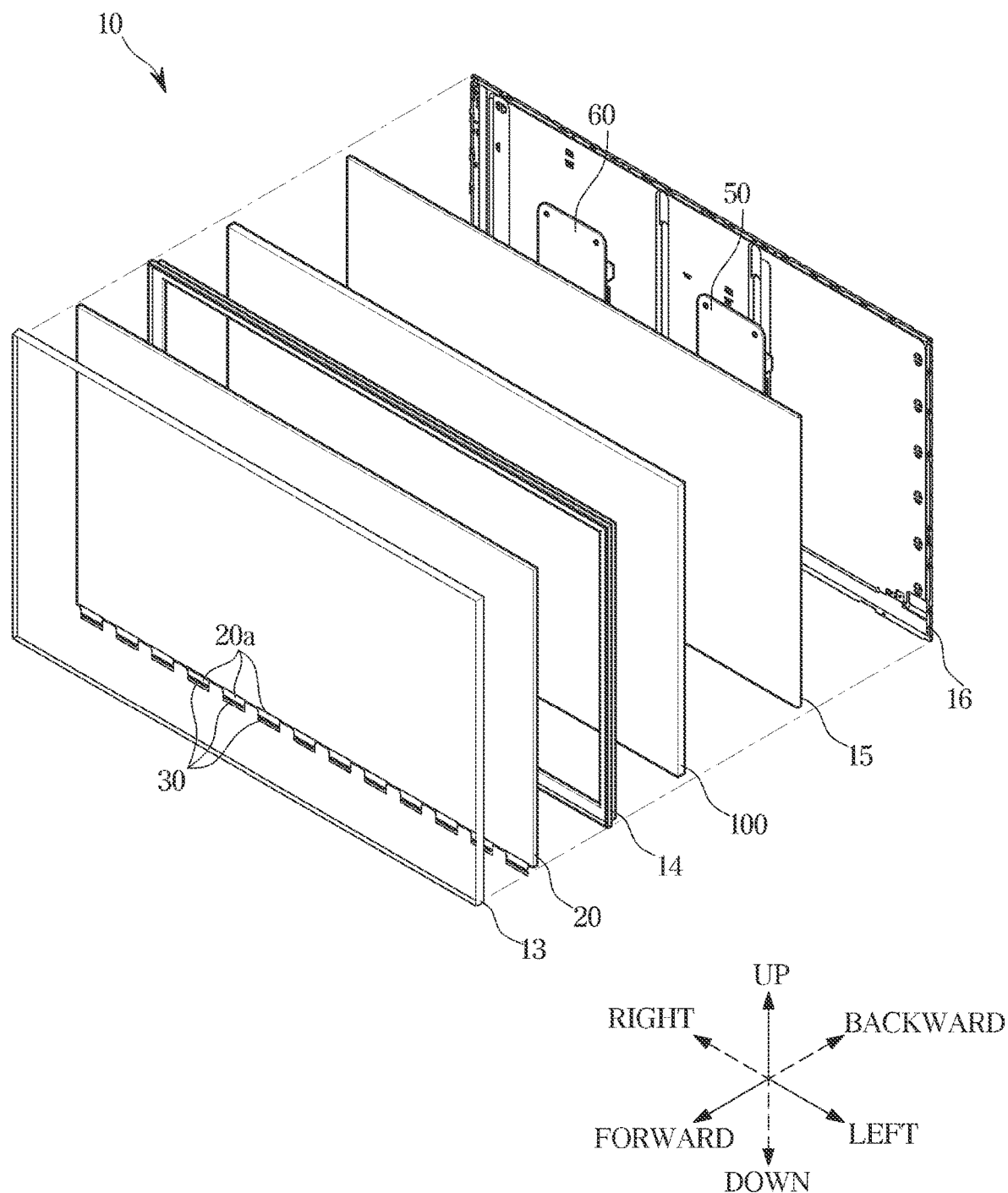
FIG. 2 is an exploded perspective view of the display apparatus according to an embodiment.
Figure 3:
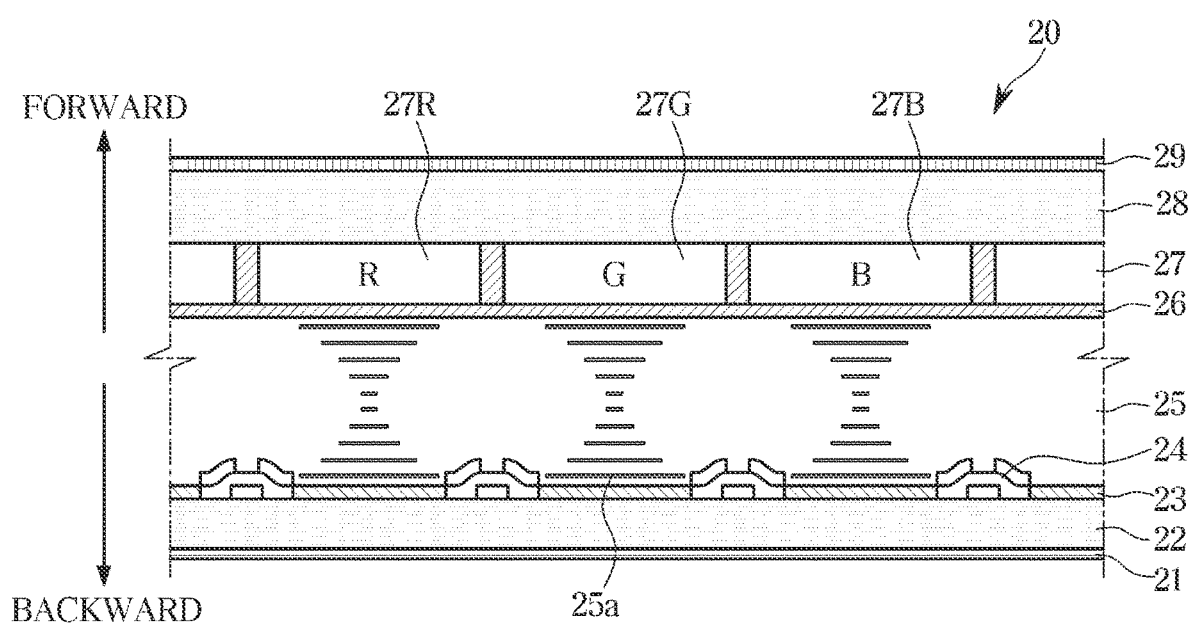
FIG. 3 is a cross-sectional view of a display panel included in the display apparatus according to an embodiment.

FIG. 2 is an exploded perspective view of the display apparatus according to an embodiment. FIG. 3 is a cross-sectional view of a display panel included in the display apparatus according to an embodiment.

Referring to FIGS. 2 and 3, various components configured to generate the image I on the screen 12 may be provided inside the body 11.

For example, the body 11 may include a light source device 100 that is a surface light source, a display panel 20 configured to block or transmit light emitted from the light source device 100, a control assembly 50 configured to control an operation of the light source device 100 and the display panel 20, and a power assembly 60 configured to supply power to the light source device 100 and the display panel 20. Further, the body 11 may include a bezel 13, a frame middle mold 14, a bottom chassis 15 and a rear cover 16 which are provided to support the display panel 20, the light source device 100, the control assembly 50 and the power assembly 60.

The light source device 100 may include a point light source configured to emit monochromatic light or white light. The light source device 100 may refract, reflect, and scatter light in order to convert light, which is emitted from the point light source, into uniform surface light. As mentioned above, the light source device 100 may refract, reflect, and scatter light emitted from the point light source, thereby emitting uniform surface light toward the front side. The light source device 100 may be referred to as a back light unit 100.

The light source device 100 is described in more detail below.

The display panel 20 may be provided in front of the light source device 100 and block or transmit light emitted from the light source device 100 to form the image I.

A front surface of the display panel 20 may form the screen 12 of the display apparatus 10 described above, and the display panel 20 may form the plurality of pixels P. In the display panel 20, the plurality of pixels P may independently block or transmit light from the light source device 100. Further, the light transmitted through the plurality of pixels P may form the image I displayed on the screen 12.

For example, as shown in FIG. 3, the display panel 20 may include a first polarizing film 21, a first transparent substrate 22, a pixel electrode 23, a thin film transistor (TFT) 24, a liquid crystal layer 25, a common electrode 26, a color filter 27, a second transparent substrate 28, and a second polarizing film 29.

The first transparent substrate 22 and the second transparent substrate 28 may fixedly support the pixel electrode 23, the TFT 24, the liquid crystal layer 25, the common electrode 26, and the color filter 27. The first and second transparent substrates 22 and 28 may be formed of tempered glass or transparent resin.

The first polarizing film 21 and the second polarizing film 29 may be provided on the outside of the first and second transparent substrates 22 and 28. Each of the first polarizing film 21 and the second polarizing film 29 may transmit specific polarized light and block (reflect or absorb) other polarized light. For example, the first polarizing film 21 may transmit light polarized in a first direction and block (reflect or absorb) other polarized light. In addition, the second polarizing film 29 may transmit light polarized in a second direction and block (reflect or absorb) other polarized light. In this case, the first direction and the second direction may be perpendicular to each other. Accordingly, polarized light passing through the first polarizing film 21 may not directly pass through the second polarizing film 29.

The color filter 27 may be provided on an inner side of the second transparent substrate 28. The color filter 27 may include a red filter 27R transmitting red light, a green filter 27G transmitting green light, and a blue filter 27B transmitting blue light. The red filter 27R, the green filter 27G, and the blue filter 27B may be disposed parallel to each other. A region occupied by the color filter 27 may correspond to the above-mentioned pixel P. A region occupied by the red filter 27R may correspond to the red sub-pixel PR, a region occupied by the green filter 27G may correspond to the green sub-pixel PG, and a region occupied by the blue filter 27B may correspond to the blue sub-pixel PB.

The pixel electrode 23 may be provided on an inner side of the first transparent substrate 22, and the common electrode 26 may be provided on an inner side of the second transparent substrate 28. The pixel electrode 23 and the common electrode 26 may be formed of a metal material through which electricity is conducted, and the pixel electrode 23 and the common electrode 26 may generate an electric field to change the arrangement of liquid crystal molecules forming the liquid crystal layer 25.

The TFT 24 may be provided in an inner side of the second transparent substrate 28. The TFT 24 may be turned on (closed) or turned off (open) by image data provided from a panel driver 30. Further, an electric field may be formed or removed between the pixel electrode 23 and the common electrode 26 depending on whether the TFT 24 is turned on (closed) or turned off (open).

The liquid crystal layer 25 may be formed between the pixel electrode 23 and the common electrode 26, and the liquid crystal layer 25 may be filled with liquid crystal molecules 25a. Liquid crystals represent an intermediate state between a solid (crystal) and a liquid. Liquid crystals may exhibit optical properties according to changes in an electric field. For example, in the liquid crystal, the orientation of molecules forming the liquid crystal may change according to a change in an electric field. As a result, the optical properties of the liquid crystal layer 25 may vary depending on the presence or absence of the electric field passing through the liquid crystal layer 25. For example, the liquid crystal layer 25 may rotate a polarization direction of light with respect to an optical axis depending on the presence or absence of an electric field. Accordingly, the polarization direction of the polarized light passing through the first polarizing film 21 may be rotated while passing through the liquid crystal layer 25, and the polarized light may pass through the second polarizing film 29.

A cable 20a configured to transmit image data to the display panel 20, and a display driver integrated circuit (DDI) (hereinafter referred to as 'panel driver') 30 configured to process digital image data and output an analog image signal may be provided at one side of the display panel 20.

The cable 20a may electrically connect the control assembly 50/the power assembly 60 to the panel driver 30, and may also electrically connect the panel driver 30 to the display panel 20. The cable 20a may include a flexible flat cable or a film cable that is bendable.

The panel driver 30 may receive image data and power from the control assembly 50/the power assembly 60 through the cable 20a. The panel driver 30 may provide the image data and driving current to the display panel 20 through the cable 20a.

In addition, the cable 20a and the panel driver 30 may be integrally implemented as a film cable, a chip on film (COF), or a tape carrier package (TCP). In other words, the panel driver 30 may be arranged on the cable 20b. However, embodiments of the disclosure are not limited thereto, and the panel driver 30 may be arranged on the display panel 20.

The control assembly 50 may include a control circuit configured to control an operation of the display panel 20 and the light source device 100. The control circuit may process a video signal and/or an audio signal received from an external content source, transmit image data to the display panel 20, and transmit dimming data to the light source device 100.

The power assembly 60 may include a power circuit configured to supply power to the display panel 20 and the light source device 100. The power circuit may supply power to the control assembly 50, the light source device 100 and the display panel 20.

The control assembly 50 and the power assembly 60 may be implemented as a printed circuit board and various circuits mounted on the printed circuit board. For example, the power circuit may include a capacitor, a coil, a resistance element, a processor, and a power circuit board on which the capacitor, the coil, the resistance element, and the processor are mounted. Further, the control circuit may include a memory, a processor, and a control circuit board on which the memory and the processor are mounted.

The light source device 100 will be described.

Figure 4:
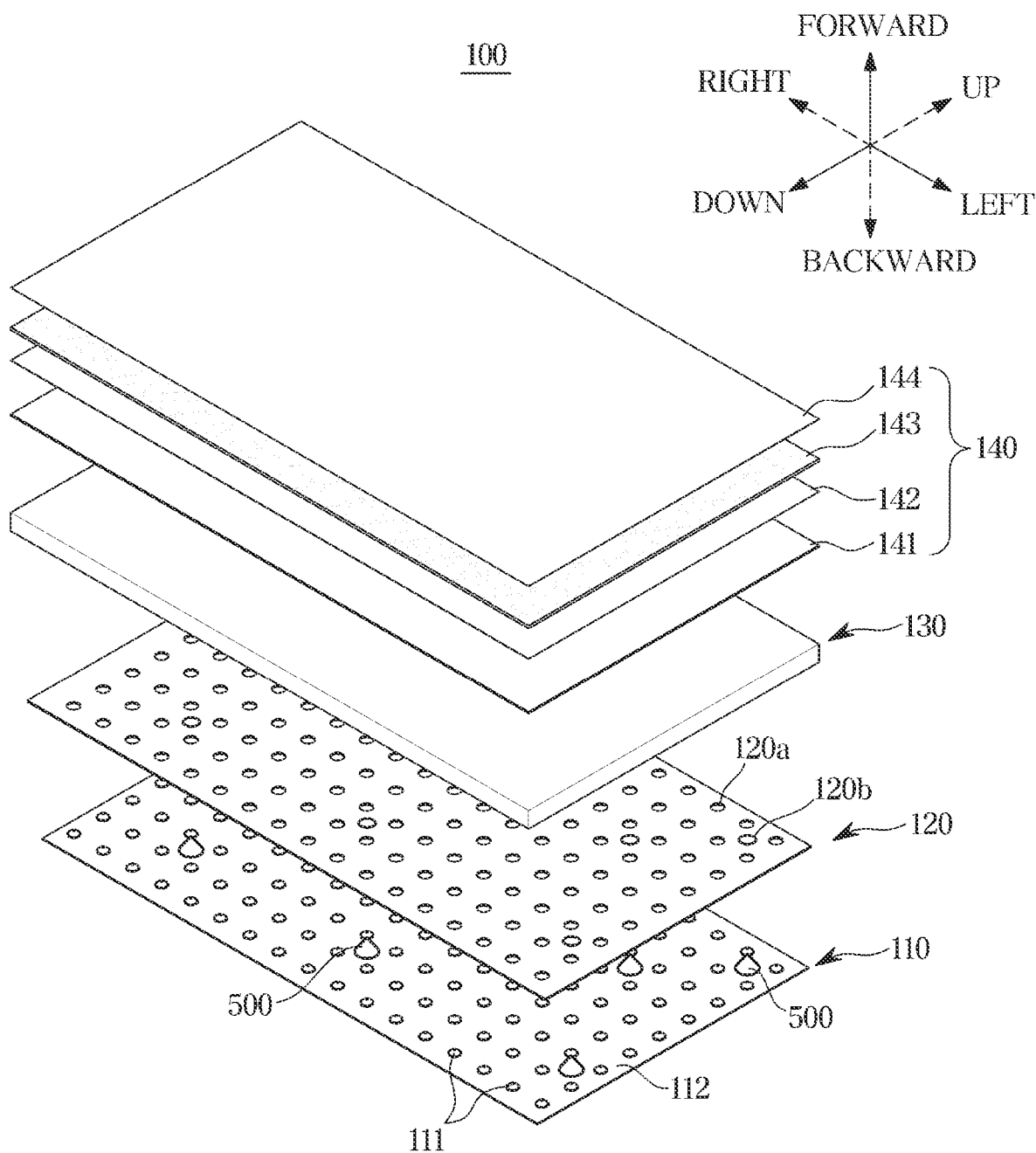
FIG. 4 is an exploded-perspective view of a light source device included in the display apparatus according to an embodiment.
Figure 5:
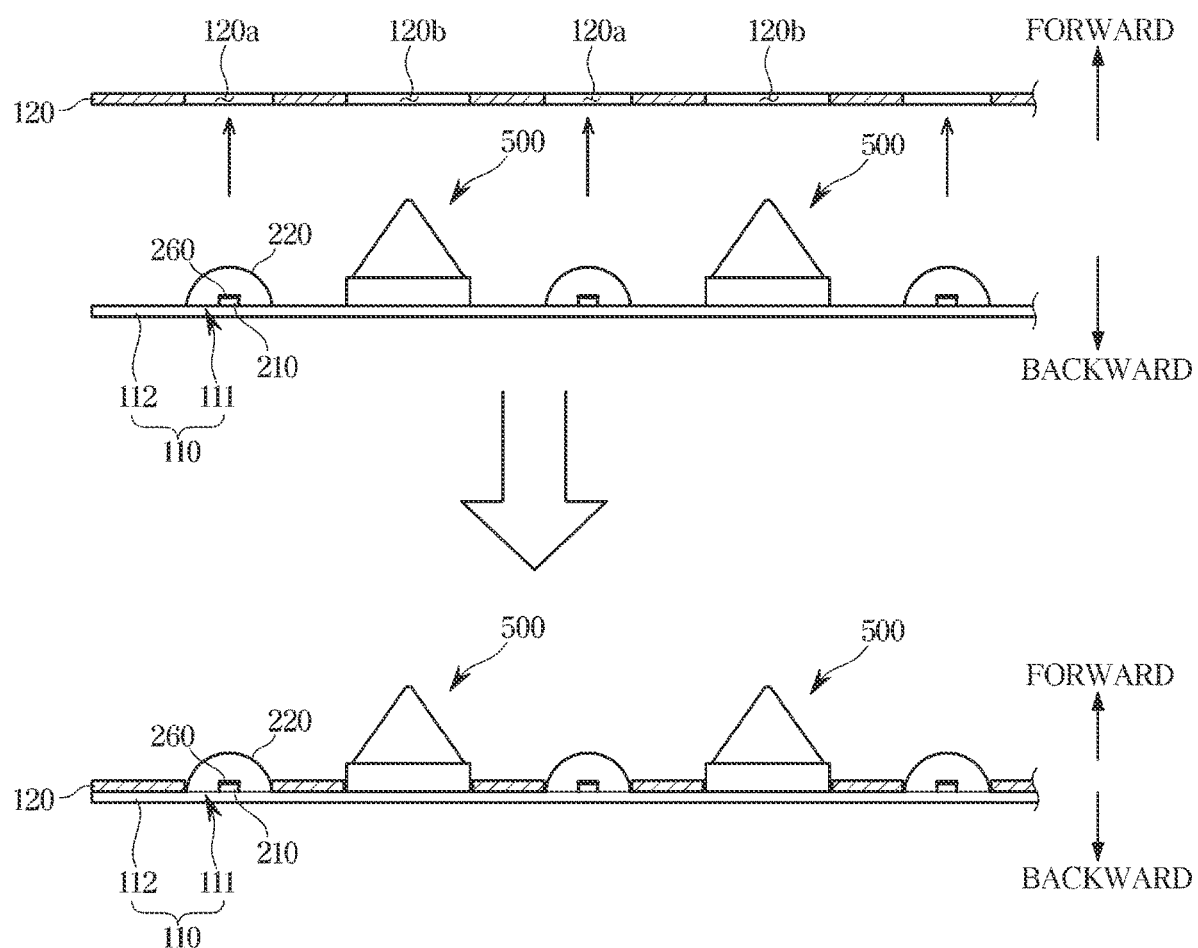
FIG. 5 is a view illustrating a combination of a light source module and a reflective sheet included in the light source device shown in FIG. 4.

FIG. 4 is an exploded-perspective view of a light source device included in the display apparatus according to an embodiment. FIG. 5 is a view illustrating a combination of a light source module and a reflective sheet included in the light source device shown in FIG. 4.

Referring to FIGS. 4 and 5, the light source device 100 may include a light source module 110 configured to generate light, a reflective sheet 120 configured to reflect light, a diffuser plate 130 configured to uniformly diffuse light, and an optical sheet 140 configured to improve a luminance of light that is emitted.

The light source module 110 may include a plurality of light sources 111 configured to emit light, and a light source substrate 112 provided to support/fix the plurality of light sources 111. The light source substrate 112 may be referred to as a substrate 112.

The plurality of light sources 111 may be disposed in a predetermined pattern to emit light with the uniform luminance. The plurality of light sources 111 may be disposed in such a way that a distance between one light source and light sources adjacent thereto is the same.

The light source 111 may employ an element configured to emit monochromatic light (light of a specific wavelength, for example, blue light) or white light (for example, light of a mixture of red light, green light, and blue light) in various directions by receiving power. For example, the light source 111 may include a light emitting diode (LED).

The substrate 112 may fix the plurality of light sources 111 to prevent a change in the position of the light source 111. Further, the substrate 112 may supply power, which is for the light source 111 to emit light, to the light source 111.

The substrate 112 may fix the plurality of light sources 111 and may be configured with synthetic resin or tempered glass or a printed circuit board (PCB) on which a conductive power supply line for supplying power to the light source 111 is formed.

The substrate 112 may be composed of an insulation layer formed of synthetic resin or tempered glass. A circuit may be printed on one side of the substrate 112. For example, a circuit pattern and/or line may be formed on a front surface of the substrate 112 facing the display panel 20.

The display apparatus according to an embodiment may further include a supporter 500. The supporter 500 may be installed on the substrate 112. The supporter 500 may be mounted on an upper surface of the substrate 112 by soldering. The supporter 500 may be provided in plurality. The plurality of supporters 500 may be disposed between the substrate 112 and the optical members 130 and 140. The plurality of supporters 500 may be mounted on the upper surface of the substrate 112 to support the optical members 130 and 140.

The supporter 500 may be provided to maintain optical characteristics of the light source device 100 by maintaining an optical distance (OD) between the light source 111 and the diffuser plate 130 and/or the optical sheet 140. The supporter 500 may be provided at a length capable of maintaining the optical characteristics of the light source device 100.

The supporter 500 may be a jumper supporter 500 that is disposed in a region, in which circuit patterns intersect each other, so as to allow the circuit patterns to be connected to each other without interference. For example, the jumper supporter 500 may be disposed in a region, in which the plurality of lines 400 intersects each other, so as to allow the plurality of lines 400 to be connected to each other without interference. Because the jumper supporter 500 allows the lines 400 provided on one side of the substrate 112 to intersect each other while supporting the optical members 130 and 140, it is possible to reduce the number of jumper connectors that is needed in the region where the lines intersect. Therefore, by reducing the number of jumper connectors, it is possible to reduce costs and improve process efficiency. Details about the jumper supporter 500 will be described later.

The reflective sheet 120 may reflect light emitted from the plurality of light sources 111 to the front side or in a direction close to the front side.

In the reflective sheet 120, a plurality of through holes 120a is formed at positions corresponding to each of the plurality of light sources 111 of the light source module 110. In addition, the light source 111 of the light source module 110 may pass through the through hole 120a and protrude to the front of the reflective sheet 120.

Further, a plurality of supporter holes 120b may be formed in the reflective sheet 120 at positions corresponding to the supporter 500. The supporter 500 may pass through the supporter hole 120b and protrude to support the diffuser plate and/or the optical sheet 140. The supporter 500 may be disposed in the supporter hole 120b.

For example, as shown in the upper portion of FIG. 5, in the process of assembling the reflective sheet 120 and the light source module 110, the plurality of light sources 111 of the light source module 110 is inserted into the through holes 120a formed on the reflective sheet 120, and the supporter 500 is inserted into the supporter hole 120b. Accordingly, as shown in the lower portion of FIG. 5, the substrate 112 of the light source module 110 may be disposed behind the reflective sheet 120, but the plurality of light sources 111 of the light source module 110 may be disposed in front of the reflective sheet 120. Accordingly, the plurality of light sources 111 may emit light in front of the reflective sheet 120.

The plurality of light sources 111 may emit light in various directions in front of the reflective sheet 120. The light may be emitted not only toward the diffuser plate 130 from the light source 111, but also toward the reflective sheet 120 from the light source 111. The reflective sheet 120 may reflect light, which is emitted toward the reflective sheet 120, toward the diffuser plate 130.

Light emitted from the light source 111 may pass through various objects, such as the diffuser plate 130 and the optical sheet 140. Among incident light beams passing through the diffuser plate 130 and the optical sheet 140, some of the incident light beams may be reflected from the surfaces of the diffuser plate 130 and the optical sheet 140. The reflective sheet 120 may reflect light reflected by the diffuser plate 130 and the optical sheet 140.

The diffuser plate 130 may be provided in front of the light source module 110 and the reflective sheet 120, and may evenly distribute the light emitted from the light source 111 of the light source module 110.

Within the diffuser plate 130, the diffuser plate 130 may diffuse light emitted from the plurality of light sources 111 to remove unevenness in luminance caused by the plurality of light sources 111. In other words, the diffuser plate 130 may uniformly emit uneven light of the plurality of light sources 111 to the front surface.

The optical sheet 140 may include various sheets for improving the luminance and luminance uniformity. For example, the optical sheet 140 may include a diffusion sheet 141, a first prism sheet 142, a second prism sheet 143, and a reflective polarizing sheet 144.

The diffusion sheet 141 may diffuse light for the luminance uniformity. The light emitted from the light source 111 may be diffused by the diffuser plate 130 and may be diffused again by the diffusion sheet 141 included in the optical sheet 140.

The first and second prism sheets 142 and 143 may increase the luminance by condensing light diffused by the diffusion sheet 141. The first and second prism sheets 142 and 143 may include a prism pattern in the shape of a triangular prism, and the prism pattern, which is provided in plurality, may be disposed adjacent to each other to form a plurality of strips.

The reflective polarizing sheet 144 is a type of polarizing film and may transmit some of the incident light beams and reflect others for improving the luminance. For example, the reflective polarizing sheet 144 may transmit polarized light in the same direction as a predetermined polarization direction of the reflective polarizing sheet 144, and may reflect polarized light in a direction different from the polarization direction of the reflective polarizing sheet 144. In addition, the light reflected by the reflective polarizing sheet 144 is recycled inside the light source device 100, and thus the luminance of the display apparatus 10 may be improved by the light recycling.

The optical sheet 140 is not limited to the sheet or film shown in FIGS. 4 and 5 and may include more various sheets, such as a protective sheet, or films.

Figure 6:
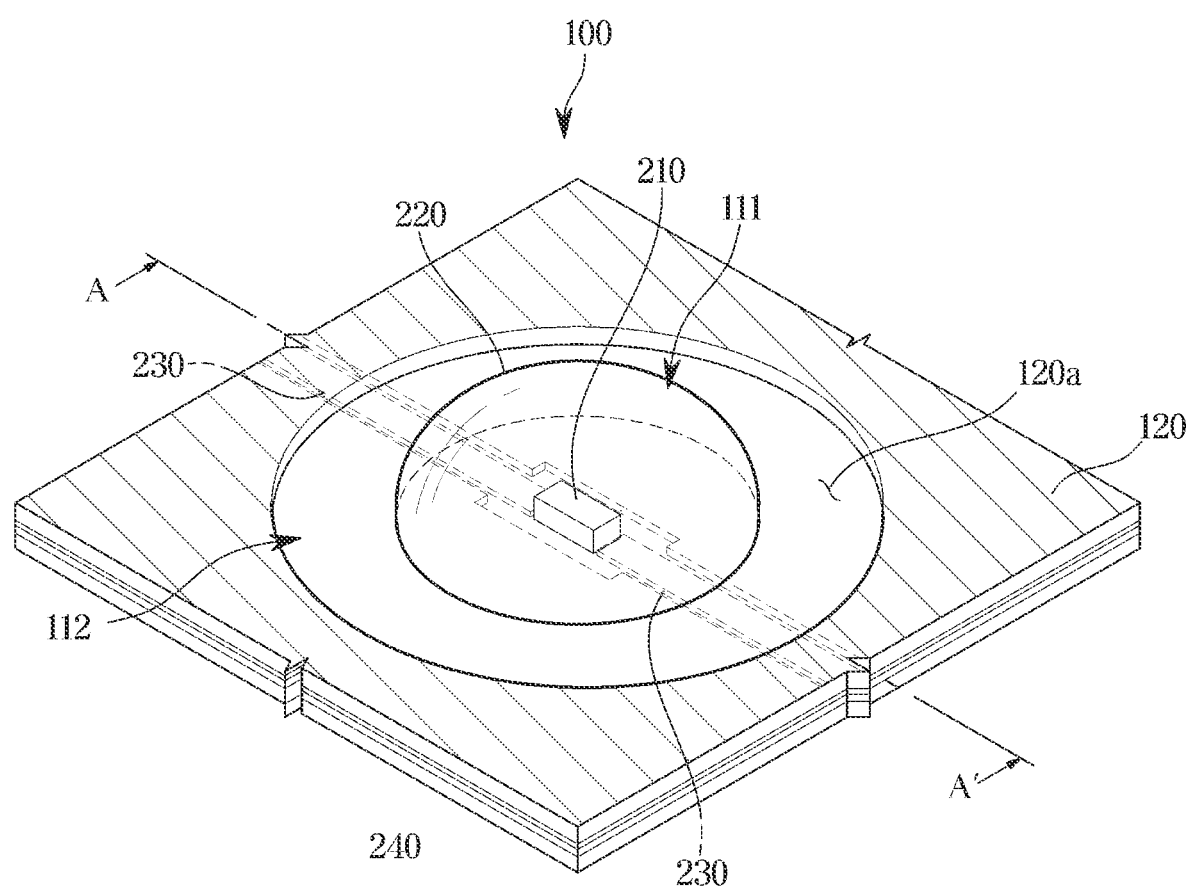
FIG. 6 is a perspective view of a light source included in the light source device according to an embodiment.
Figure 7:
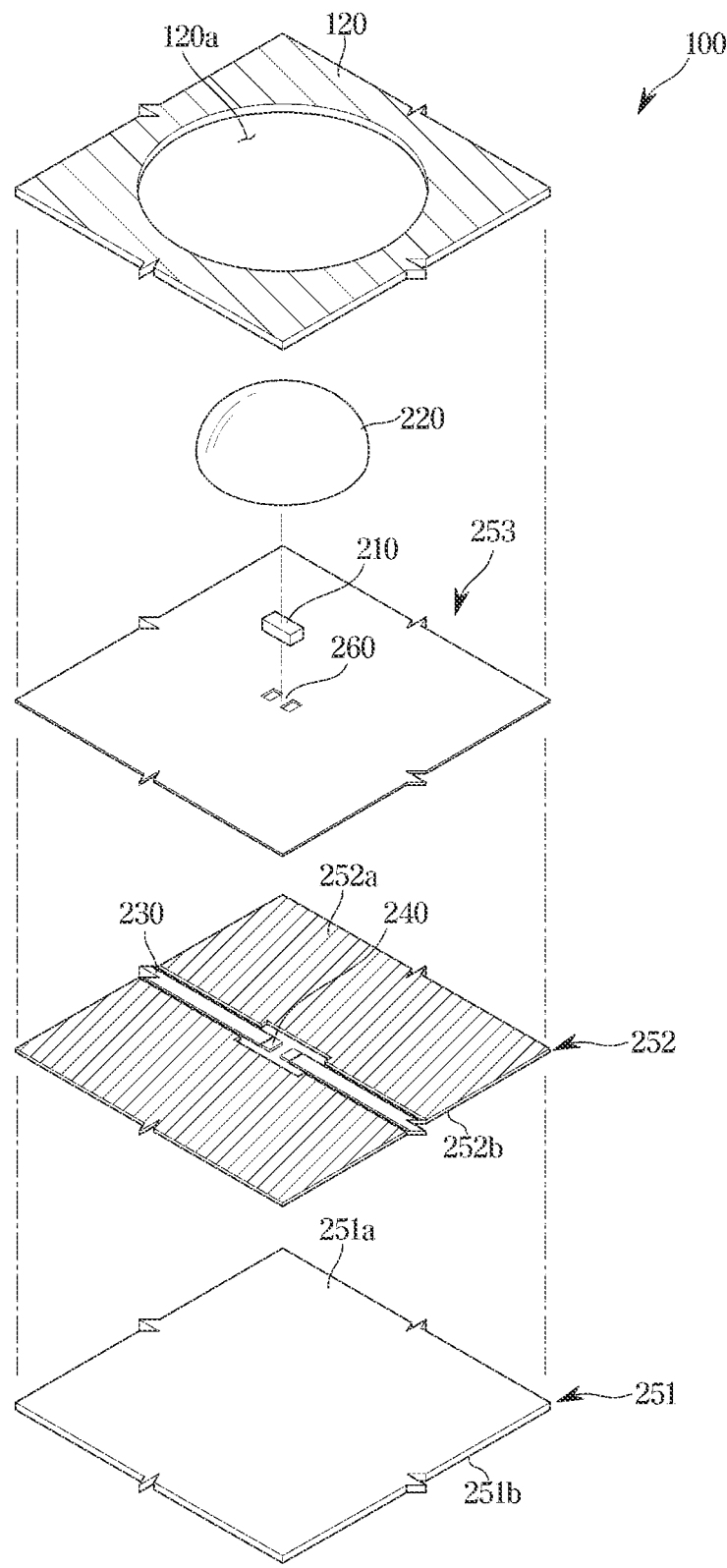
FIG. 7 is an exploded perspective view of the light source shown in FIG. 6.
Figure 8:
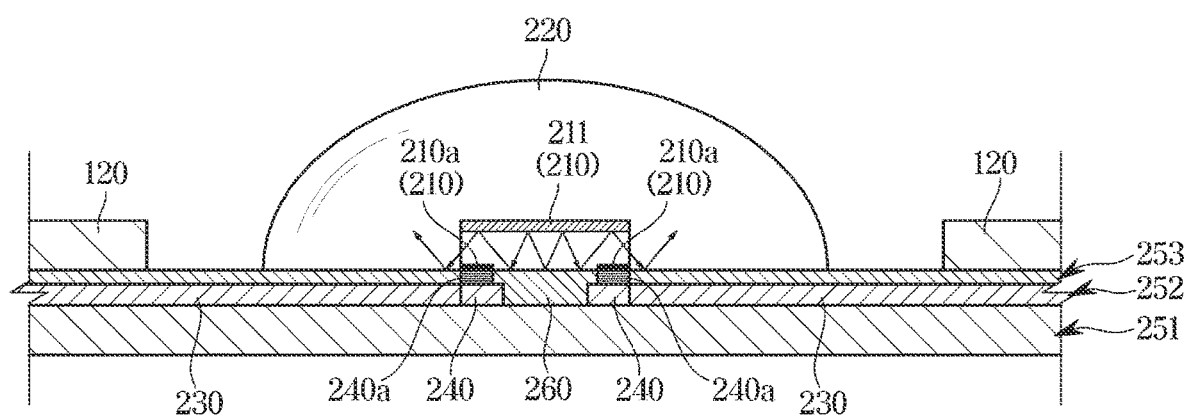
FIG. 8 is a cross-sectional view of the light source and a substrate shown in FIG. 6 taken along a direction A-A'.

FIG. 6 is a perspective view of a light source included in the light source device according to an embodiment. FIG. 7 is an exploded-perspective view of the light source shown in FIG. 6. FIG. 8 is a cross-sectional view of the light source and a substrate shown in FIG. 6 taken along a direction A-A.

Referring to FIGS. 6 to 8, the light source module 110 may include the plurality of light sources 111. The plurality of light sources 111 may protrude forward of the reflective sheet 120 from the rear of the reflective sheet 120 by passing through the through hole 120*a*. Accordingly, the light source 111 and a part of the substrate 112 may be exposed toward the front of the reflective sheet 120 through the through hole 120*a*.

The light source 111 may include an electrical/mechanical structure disposed in a region defined by the through hole 120*a* of the reflective sheet 120. Each of the plurality of light sources 111 may include a light emitting diode 210 and an optical dome 220.

It is possible to increase the number of light sources 111 to improve the uniformity of the surface light emitted from the light source device 100 and to improve the contrast ratio by the local dimming.

The light emitting diode 210 may include a P-type semiconductor and an N-type semiconductor for emitting light by recombination of holes and electrons. In addition, the light emitting diode 210 may be provided with a pair of electrodes 210*a* for supplying hole and electrons to the P-type semiconductor and the N-type semiconductor, respectively.

The light emitting diode 210 may convert electrical energy into optical energy. In other words, the light emitting diode 210 may emit light having a maximum intensity at a predetermined wavelength to which power is supplied. For example, the light emitting diode 210 may emit blue light having a peak value at a wavelength indicating blue color (for example, a wavelength between 450 nm and 495 nm).

The light emitting diode 210 may be directly attached to the substrate 112 in a Chip On Board (COB) method. In other words, the light source 111 may include the light emitting diode 210 in which a light emitting diode chip or a light emitting diode die is directly attached to the substrate 112 without an additional packaging.

In order to reduce a region occupied by the light emitting diode 210, the light emitting diode 210 may be manufactured as a flip chip type that does not include a Zener diode. When attaching the flip-chip type light emitting diode 210, which is a semiconductor device, to the substrate 112, it is possible to fuse an electrode pattern of the semiconductor device to the substrate 112 as it is, without using an intermediate medium such as a metal lead (wire) or ball grid array (BGA).

Because the metal lead (wire) or ball grid array is omitted as mentioned above, it is possible to reduce the size of the light source 111 including the flip-chip type light emitting diode 210.

The light source module 110, in which the flip-chip type light emitting diode 210 is attached to the substrate 112 in a chip-on-board method to reduce the size of the light source 111, may be manufactured.

In the above, the flip-chip type light emitting diode 210 that is directly fused to the substrate 112 in a chip-on board manner has been described, but the light source 111 is not limited to the flip-chip type light emitting diode. For example, the light source 111 may include a package type light emitting diode.

A feeding line 230 and a feeding pad 240 for supplying power to the light emitting diode 210 are provided on the substrate 112.

The feeding line 230 for supplying electrical signals and/or power to the light emitting diode 210 from the control assembly 50 and/or the power assembly 60 is provided on the substrate 112.

As shown in FIG. 8, the substrate 112 may be formed by alternately laminating an insulation layer 251 that is non-conductive and a conduction layer 252 that is conductive.

The insulation layer 251 may include a first surface 251*a* and a second surface 251*b*, and the conduction layer 252 may also include a first surface 252*a* and a second surface 252*b*. The conduction layer 252 may be laminated on a first side of the insulation layer 251. For example, the conduction layer 252 may be laminated on the first surface 251*a* of the insulation layer 251. Further, the jumper supporter 500, which will be described later, may be disposed on a first side of the conduction layer 252. For example, the jumper supporter 500 may be disposed on the first surface 252*a* of the conduction layer 252 and the jumper supporter 500 may be electrically connected to the conduction layer 252 by soldering portions 601 and 602 so as to connect a first portion 401 and a second portion 402 of the line 400.

A line or pattern, through which power and/or electrical signals pass, may be formed on the conduction layer 252. The conduction layer 252 may be formed of various materials having an electrical conductivity. For example, the conduction layer 252 may be formed of various metal materials, such as copper (Cu), tin (Sn), aluminum (Al), or an alloy thereof. The conduction layer 252 may be laminated on one surface of the insulation layer 251.

A dielectric of the insulation layer 251 may insulate between lines or patterns of the conduction layer 252. The insulation layer 251 may be formed of a dielectric, such as FR-4, for electrical insulation.

The feeding line 230 may be implemented by a line or pattern formed on the conduction layer 252. The feeding line 230 may be electrically connected to the light emitting diode 210 through the feeding pad 240. The feeding pad 240 may be formed in such a way that the feeding line 230 is exposed to the outside.

A protection layer 253 configured to prevent or suppress damages caused by an external impact and/or damages caused by a chemical action (for example, corrosion, etc.) and/or damages caused by an optical action, to the substrate 112 may be formed at an outermost part of the substrate 112. The protection layer 253 may include a photo solder resist (PSR).

As shown in FIG. 8, the protection layer 253 may cover the feeding line 230 to prevent the feeding line 230 from being exposed to the outside.

For electrical contact between the feeding line 230 and the light emitting diode 210, a window may be formed in the protection layer 253 to expose a portion of the feeding line 230 to the outside. A portion of the feeding line 230 exposed to the outside through the window of the protection layer 253 may form the feeding pad 240.

A conductive adhesive material 240a for the electrical contact between the feeding line 230 exposed to the outside and the electrode 210a of the light emitting diode 210 may be applied to the feeding pad 240. The conductive adhesive material 240a may be applied within the window of the protection layer 253.

The electrode 210a of the light emitting diode 210 may be in contact with the conductive adhesive material 240a, and the light emitting diode 210 may be electrically connected to the feeding line 230 through the conductive adhesive material 240a.

The conductive adhesive material 240a may include a solder having an electrical conductivity. However, embodiments of the disclosure are not limited thereto, and the conductive adhesive material 240a may include electrically conductive epoxy adhesives.

Power may be supplied to the light emitting diode 210 through the feeding line 230 and the feeding pad 240, and in response to the supply of the power, the light emitting diode 210 may emit light. A pair of feeding pads 240 corresponding to each of the pair of electrodes 210a provided in the flip-chip type light emitting diode 210 may be provided.

The optical dome 220 may cover the light emitting diode 210. The optical dome 220 may prevent or suppress damages to the light emitting diode 210 caused by an external mechanical action and/or damages to the light emitting diode 210 caused by a chemical action.

The optical dome 220 may have a dome shape formed in such a way that a sphere is cut into a surface not including the center thereof, or may have a hemispherical shape in such a way that a sphere is cut into a surface including the center thereof. A vertical cross section of the optical dome 220 may be a bow shape or a semicircle shape.

The optical dome 220 may be formed of silicone or epoxy resin. For example, the molten silicon or epoxy resin may be discharged onto the light emitting diode 210 through a nozzle, and the discharged silicon or epoxy resin may be cured, thereby forming the optical dome 220.

Accordingly, the shape of the optical dome 220 may vary depending on the viscosity of the liquid silicone or epoxy resin. For example, when manufacturing the optical dome 220 using silicon having a thixotropic index of about 2.7 to 3.3 (appropriately, 3.0), the optical dome 220 may have a dome ratio, indicating a ratio of a height of a dome to a diameter of a base of the dome (a height of the dome/a diameter of a base), of approximately 0.25 to 0.31 (appropriately 0.28). For example, the optical dome 220 formed of silicon having a thixotropic index of approximately 2.7 to 3.3 (appropriately, 3.0) may have a diameter of the base of approximately 2.5 mm and a height of approximately 0.7 mm.

The optical dome 220 may be optically transparent or translucent. Light emitted from the light emitting diode 210 may be emitted to the outside by passing through the optical dome 220.

In this case, the dome-shaped optical dome 220 may refract light like a lens. For example, light emitted from the light emitting diode 210 may be refracted by the optical dome 220 and thus may be dispersed.

As mentioned above, the optical dome 220 may disperse light emitted from the light emitting diode 210 as well as protecting the light emitting diode 210 from external mechanical and/or chemical or electrical actions.

An antistatic member may be formed in a vicinity of the optical dome 220 to protect the light emitting diode 210 from electrostatic discharge. The antistatic member may absorb electrical shock caused by electrostatic discharge generated near the optical dome 220.

Referring to FIG. 8, the light source module 110 may include the non-conductive insulation layer 251, the conductive conduction layer 252 laminated on the front surface 251a of the insulation layer 251 and including the feeding line 230, and the non-conductive protection layer 253 laminated on the front surface 252a of the conduction layer 252. The insulation layer 251 may be referred to as a first layer, the conduction layer 252 may be referred to as a second layer, and the protection layer 253 may be referred to as a third layer.

The light emitting diode 210 may be disposed on the protection layer 253. Particularly, the light emitting diode 210 may be disposed on the front surface of the substrate 112 to cover the window formed on the protection layer 253.

The pair of feeding pads 240 may be formed on the conduction layer 252 and connected to the feeding line 230. The pair of feeding pads 240 may be electrically connected to the light emitting diode 210 through the window formed in the protection layer 253. The pair of feeding pads 240 may be arranged separately from each other.

The light source module 110 may include a reflection auxiliary layer 260.

In an embodiment, the reflection auxiliary layer 260 along with the protection layer 253 may be formed between the pair of feeding pads 240, thereby reducing a defect rate due to the asymmetry in the size of the pair of feeding pads 240.

The light emitting diode 210 may include a Distributed Bragg Reflector (DBR) layer 211.

The DBR layer 211 is a multilayer reflector composed of two materials with different refractive indices. Due to the difference in refractive index of each material, Fresnel reflection occurs at an interface of each DBR layer 211. Accordingly, the light incident on the DBR layer may be reflected at a wide range of angles, and thus a beam angle of the light emitting diode 210 may be set to approximately 165 degrees or more.

Light emitted from the light emitting diode 210 may be reflected by the DBR layer 211 and re-reflected by the reflection auxiliary layer 260. Accordingly, it is possible to prevent loss of light traveling into a space between the pair of feeding pads 240.

Particularly, because the reflection auxiliary layer 260 is formed of a material with a higher reflectivity than the insulation layer 251, the reflection auxiliary layer 260 may cover the front of the insulation layer 251 so as to prevent a case in which light traveling to the rear of the light emitting diode 210 is absorbed by the insulation layer 251 and the loss of the light occurs.

Figure 9:
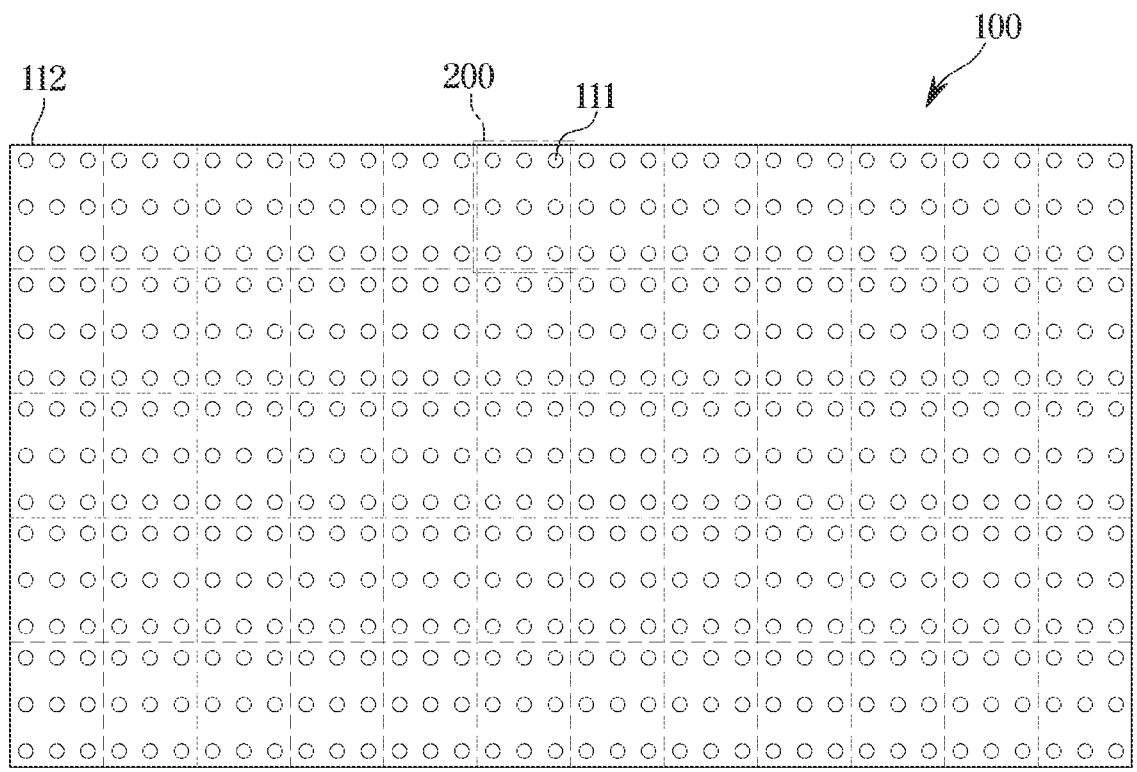
FIG. 9 is a view illustrating a plurality of light sources divided into a plurality of dimming blocks in the display apparatus according to an embodiment.
Figure 10:
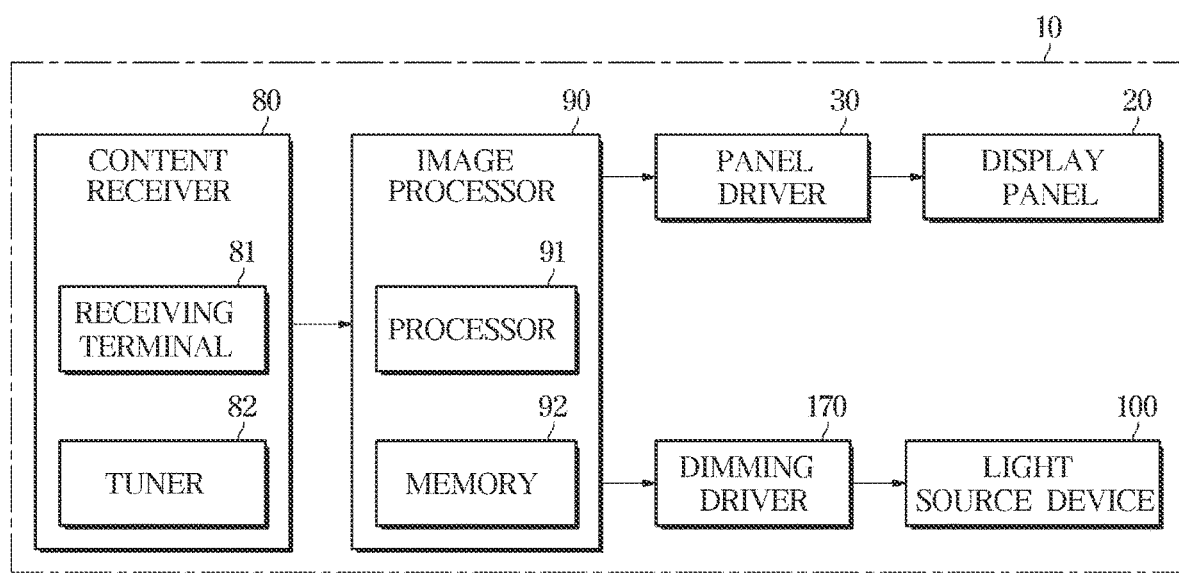
FIG. 10 is a control block diagram of the display apparatus according to an embodiment.

FIG. 9 is a view illustrating a plurality of light sources divided into a plurality of dimming blocks in the display apparatus according to an embodiment. FIG. 10 is a control block diagram of the display apparatus according to an embodiment.

In order to improve the power consumption while increasing the contrast ratio, the display apparatus 10 may perform local dimming to vary the brightness of light for each region of the light source device 100 in conjunction with the output image.

For example, the display apparatus 10 may reduce the brightness of the light of the light source 111 of the light source device 100 corresponding to a dark part of the image, so as to make the dark part of the image darker, and the display apparatus 10 may increase the brightness of the light of the light source 111 of the light source device 100 corresponding to a bright part of the image, so as to make the bright part of the image brighter. Accordingly, the contrast ratio of the image may be improved.

The display apparatus 10 may divide the light source device 100 into a plurality of blocks and independently adjusts the current for each block according to the input image. Image transmission from the display apparatus 10 may be performed through local dimming driving for each frame, and the driving of the current may be adjusted according to the number of blocks of the light source 111 divided within the light source device 100.

As a result, the display apparatus 10 may effectively improve the contrast ratio by reducing the supply current to the dimming block corresponding to the dark area of the input image and by increasing the supply current to the dimming block corresponding to the bright area of the input image.

For the local dimming, the plurality of light sources 111 included in the light source device 100 may be divided into a plurality of dimming blocks 200. For example, as shown in FIG. 9, the plurality of dimming blocks 200 may be composed of 5 rows and 12 columns, and thus a total of 60 dimming blocks may be provided. However, the number of dimming blocks 200 is not limited thereto.

Referring to FIG. 9, each of the plurality of dimming blocks 200 may include at least one light source 111. The light source device 100 may supply the same driving current to the light sources 111 belonging to the same dimming block 200, and the light sources 111 belonging to the same dimming block 200 may emit light of the same brightness.

In addition, the light source device 100 may supply different driving current to the light sources 111 belonging to different dimming blocks 200 according to dimming data, and thus the light sources 111 belonging to different dimming blocks 200 may emit light of different brightness.

The plurality of dimming blocks 200 may include N*M light sources arranged in an N*M matrix (N, M are natural numbers). An N*M matrix means a matrix with N rows and M columns.

Because each light source 111 includes a light emitting diode, each of the plurality of dimming blocks 200 may include N*M light emitting diodes.

The plurality of dimming blocks 200 may be disposed on the substrate 112. That is, N*M light emitting diodes may be disposed on the substrate 112.

Referring to FIG. 10, the display apparatus 10 may include a content receiver 80, an image processor 90, the panel driver 30, the display panel 20, a dimming driver 170, and the light source device 100.

The content receiver 80 may include a receiving terminal 81 and a tuner 82 that receive content including video signals and/or audio signals from content sources.

The receiving terminal 81 may receive video signals and audio signals from content sources through a cable.

The tuner 82 may receive a broadcast signal from a broadcast reception antenna or a wired cable. Further, the tuner 82 may extract a broadcast signal of a channel selected by a user from broadcast signals.

The content receiver 80 may receive video signals and audio signals from content sources through the receiving terminal 81 and/or the tuner 82. The content receiver 80 may output video signals and/or audio signals, which are received through the receiving terminal 81 and/or the tuner 82, to the image processor 90.

The image processor 90 may include a processor 91 configured to process image data, and a memory 92 configured to memorize/store programs and data for processing image data.

The memory 92 may store programs and data for processing video signals and/or audio signals. Further, the memory 92 may temporarily store data that is generated in processing video signals and/or audio signals.

The processor 91 may receive video signals and/or audio signals from the content receiver 80. The processor 91 may decode the video signal into image data. The processor 91 may generate dimming data from the image data. Further, the processor 91 may output image data and dimming data to the panel driver 30 and the dimming driver 170, respectively.

The image processor 90 may generate image data and dimming data from the video signal obtained by the content receiver 80. Further, the image processor 90 may transmit image data and dimming data to the display panel 20 and the light source device 100, respectively.

Image data may include information about the intensity of light transmitted by each of the plurality of pixels (or a plurality of sub-pixels) included in the display panel 20. The image data may be provided to the display panel 20 through the panel driver 30.

The panel driver 30 may receive image data from the image processor 90. The panel driver 30 may drive the display panel 20 according to the image data. In other words, the panel driver 30 may convert image data, which is a digital signal (hereinafter referred to as 'digital image data'), into an analog image signal, which is an analog voltage signal. The panel driver 30 may provide the analog image signal to the display panel 20. The optical properties (e.g., light transmittance) of the plurality of pixels included in the display panel 20 may change according to the analog image signal.

The panel driver 30 may include a timing controller, a data driver, a scan driver, etc.

The timing controller may receive image data from the image processor 90. The timing controller may output image data and drive control signals to the data driver and the scan driver. The drive control signal may include a scan control signal and a data control signal. The scan control signal and the data control signal may be used to control the operation of the scan driver and the data driver, respectively.

The scan driver may receive a scan control signal from the timing controller. The scan driver may activate the input of any one row among the plurality of rows in the display panel 20 according to the scan control signal. In other words, the scan driver may convert pixels, which is included in one row among a plurality of pixels arranged in a plurality of rows and a plurality of columns, into a state capable of receiving an analog image signal. At this time, pixels other than pixels in which the input is activated by the scan driver may not receive the analog image signal.

The data driver may receive image data and data control signals from the timing controller. The data driver may output image data to the display panel 20 according to the data control signal. For example, the data driver may receive digital image data from the timing controller. The data driver may convert digital image data into analog image signals.

Further, the data driver may provide an analog image signal to pixels included in any one input-activated row by the scan driver. At this time, pixels in which the input is activated by the scan driver may receive analog image signals. The optical properties (e.g., light transmittance) of input-activated pixels change according to the received analog image signal.

The panel driver 30 may drive the display panel 20 according to image data. Accordingly, an image corresponding to the image data may be displayed on the display panel 20.

Further, the dimming data may include information about the intensity of light emitted by each of the plurality of light sources (or plurality of dimming blocks) included in the light source device 100. The dimming data may be provided to the light source device 100 through the dimming driver 170.

The light source device 100 may include the plurality of light sources 111 configured to emit light. The plurality of light sources 111 is arranged in a matrix form. In other words, the plurality of light sources 111 may be arranged in a plurality of rows and columns.

The light source device 100 may be divided into the plurality of dimming blocks 200. Further, each of the plurality of dimming blocks 200 may include at least one light source.

The light source device 100 may output surface light by diffusing light emitted from the plurality of light sources 111. The display panel 20 may include the plurality of pixels, and the display panel 20 may control each of the plurality of pixels to transmit light or block light. An image may be formed by light passing through each of the plurality of pixels.

The light source device 100 may turn off the plurality of light sources corresponding to the dark part of the image, so as to make the dark part of the image darker. Accordingly, as the dark part of the image becomes darker, the contrast ratio of the image may be improved.

Hereinafter an operation, in which the light source device 100 controls the plurality of light sources to emit light in an area corresponding to the bright part of the image and controls the plurality of light sources to not emit light in an area corresponding to the dark part of the image, will be referred to as "local dimming."

For the local dimming, the plurality of light sources 111 included in the light source device 100 may be divided into the plurality of dimming blocks 200 as shown in FIG. 9. In FIG. 9, a total of 60 dimming blocks in 5 rows and 12 columns are shown, but the number and arrangement of dimming blocks are not limited to those shown in FIG. 9.

Each of the plurality of dimming blocks 200 may include at least one light source 111. The light source device 100 may supply the same driving current to light sources belonging to the same dimming block, and the light sources belonging to the same dimming block may emit light of the same brightness. For example, light sources belonging to the same dimming block may be connected to each other in series, and thus the same driving current may be supplied to the light sources belonging to the same dimming block.

Further, the light source device 100 may further include a plurality of driving elements 300 configured to control driving current supplied to light sources included in each of the plurality of dimming blocks 200. The driving elements 300 may each be provided to correspond to at least one dimming block 200. In other words, the driving elements 300 may each drive the dimming block 200.

Because the light sources included in the dimming block are connected to each other in series, the light sources included in the dimming block may operate as one unit and may form a light source block as one unit.

Therefore, hereinafter, "supplying driving current to the dimming block" may be interpreted as having the same meaning as "supplying driving current to the light sources included in the dimming block."

FIG. 9 illustrates dimming blocks each including nine light sources, but the number and arrangement of light sources included in each dimming block are not limited to those shown in FIG. 9.

As mentioned above, the image processor 90 may provide dimming data for the local dimming to the light source device 100. The dimming data may include information about the luminance of each of the plurality of dimming blocks 200. For example, the dimming data may include information about the intensity of light output from light sources included in each of the plurality of dimming blocks 200.

The image processor 90 may obtain dimming data from image data.

The image processor 90 may convert image data into dimming data in various ways. For example, the image processor 90 may divide the image I based on image data into a plurality of image blocks. The number of the plurality of image blocks may be equal to the number of the plurality of dimming blocks 200, and each of the plurality of image blocks may correspond to the plurality of dimming blocks 200.

The image processor 90 may obtain a luminance value of the plurality of dimming blocks 200 from the image data of the plurality of image blocks. Further, the image processor 90 may generate dimming data by combining the luminance values of the plurality of dimming blocks 200.

For example, the image processor 90 may obtain a luminance value of each of the plurality of dimming blocks 200 based on a maximum value among luminance values of pixels included in each image block.

A single image block may include a plurality of pixels, and image data of the single image block may include image data of a plurality of pixels (e.g., red data, green data, blue data, etc.). The image processor 90 may calculate the luminance value of each pixel based on the image data of each pixel.

The image processor 90 may set a maximum value among the luminance values of each pixel included in the image block as a luminance value of the dimming block corresponding to the image block. For example, the image processor 90 may set a maximum value among luminance values of pixels included in a $i^{th}$ image block as a luminance value of a $i^{th}$ dimming block, and set a maximum value among luminance values of pixels included in a $j^{th}$ image block as a luminance value of a $j^{th}$ dimming block.

The image processor 90 may generate dimming data by combining the luminance values of the plurality of dimming blocks 200.

The dimming driver 170 may receive dimming data from the image processor 90. The dimming driver 170 may drive the light source device 100 according to the dimming data. The dimming data may include information about the luminance of each of the plurality of dimming blocks 200 or information about the brightness of light sources included in each of the plurality of dimming blocks 200.

The dimming driver 170 may convert dimming data, which is a digital voltage signal, into analog driving current.

The dimming driver 170 may sequentially provide an analog dimming signal to the driving elements 300 corresponding to each of the dimming blocks 200 in an active matrix method.

The dimming driver 170 may include a connector. The dimming driver 170 may transmit a scan signal, a data signal, and a power signal to the driving element 300 through the connector.

The plurality of dimming blocks 200 may be divided into a plurality of groups. Driving current may be supplied simultaneously to dimming blocks belonging to the same group, and driving current may be supplied sequentially at different times to dimming blocks belonging to different groups. The dimming driver 170 may activate dimming blocks belonging to one of the plurality of groups and provide an analog dimming signal to the activated dimming blocks. Thereafter, the dimming driver 170 may activate dimming blocks belonging to different groups and provide an analog dimming signal to the activated dimming blocks.

For example, dimming blocks located in the same row may belong to the same group, and dimming blocks located in different rows may belong to different groups, but the group classification method is not limited thereto. The dimming driver 170 may activate dimming blocks belonging to one group and provide an analog dimming signal to the activated dimming blocks. Thereafter, the dimming driver 170 may activate the input of dimming blocks belonging to another row and provide an analog dimming signal to the dimming blocks in which the input is activated.

A drive circuit of each of the dimming blocks 200 may provide analog driving current corresponding to an analog dimming signal to the light source module 110. The light sources 111 included in the light source module 110 may emit light by the analog driving current. According to dimming data, light sources belonging to the same dimming block may emit light of the same intensity. Further, according to dimming data, light sources belonging to different dimming blocks may emit light of different intensities.

Figure 11:
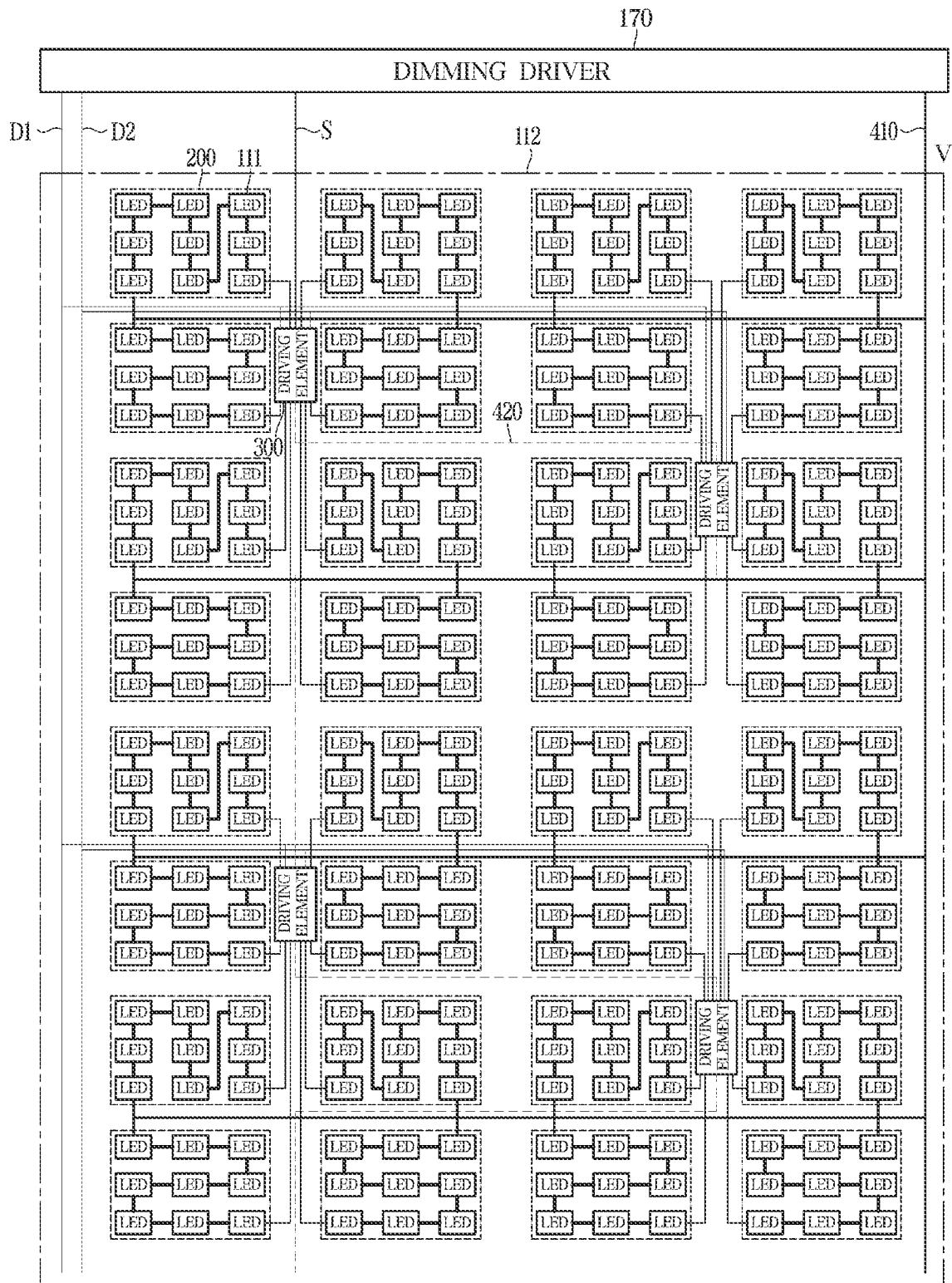
FIG. 11 illustrates an example of a connection structure of a dimming driver, a driving element, and a dimming block, and line arrangement in the light source device in the display apparatus according to an embodiment.

FIG. 11 illustrates an example of a connection structure of a dimming driver, a driving element, and a dimming block, and line arrangement in the light source device in the display apparatus according to an embodiment.

Referring to FIG. 11, each of the plurality of dimming blocks may include the plurality of light sources (light emitting diodes) 111 connected in series. For example, the light emitting diode 111 included in one dimming block 200 may be connected to the driving element 300 for light emission.

Hereinafter for convenience of description, a light source connected to a power line 410 in each of the plurality of dimming blocks 200 is defined as 'start light source', and a light source connected to the driving element 300 is defined as 'last light source'.

Among the plurality of light sources 111 connected in series and belonging to one dimming block 200, a light source 111, which is the first in the series connection, may be connected to the power line 410 and receive power (driving voltage; VLED), and a light source 111, which is the last in the series connection, may be connected to the driving element 300.

While being input-activated by the dimming driver 170, the driving element 300 may receive an analog dimming signal from the dimming driver 170 and store the received analog dimming signal. Further, while being input-inactivated, the plurality of driving elements 300 may supply driving current corresponding to the stored analog dimming signal to the plurality of light sources (light emitting diodes 111).

The driving element 300 may control the driving current supplied to each of the plurality of dimming blocks 200 while the driving voltage VLED is applied to the plurality of dimming blocks 200.

For this, the display apparatus 10 may include a plurality of scan lines S for providing scan signals to the plurality of driving elements 300 and a plurality of data lines D1 and D2 for providing analog dimming signals to the plurality of driving elements 300.

Further, the display apparatus 10 may include the power line 410 for providing driving voltage to the plurality of driving elements 300.

The plurality of scan lines S, the plurality of data lines D1 and D2, and the power line 410 may be formed on the substrate 112.

The power line 410, the scan line S, and the data lines D1 and D2 may be formed on the substrate 112. For example, the power line 410, the scan line S, and the data lines D1 and D2 may all be formed on a second surface 112b of the substrate 112.

The plurality of driving elements 300 may include circuits of various topologies to implement the active matrix driving.

For example, each of the plurality of driving elements 300 may include a circuit of a 1C2T (one capacitor two transistor) topology. However, the circuit structure of the driving element 300 is not limited thereto. For example, the driving element 300 may include a 3T1C topology circuit in which a transistor is added to correct the body effect of the driving transistor.

The driving element 300 may be provided as a single chip with an integrated drive circuit. In other words, the drive circuit may be integrated into one semiconductor chip.

The dimming driver 170 may transmit dimming data corresponding to the input image to the plurality of driving elements 300 through the data lines D1 and D2.

Further, the dimming driver 170 may transmit a timing signal corresponding to a light emission timing of the plurality of dimming blocks 200 to the plurality of driving elements 300 through the scan line S.

The plurality of driving elements 300 may control the driving current supplied to each of the plurality of dimming blocks 200 based on dimming data and timing signals.

FIG. 11 illustrates some of the plurality of dimming blocks 200. As for the display apparatus 10 according to an embodiment, more dimming blocks 200, more driving elements 300, more data lines D1 and D2, and more scan lines S and more power lines 410 connecting the dimming blocks 200 and the driving elements 300 are required for the local dimming.

Therefore, it is required to simplify the arrangement of the data lines D1 and D2, the scan lines S, and the power line 410 on the substrate 112.

According to an embodiment, the line may include a line (hereinafter referred to as a "control line") connecting the data lines D1 and D2, the scan lines S, the power line 410, the plurality of driving elements 300, and the plurality of dimming blocks 200, and a line (hereinafter referred to as a "block line") connecting the plurality of light sources. However, the type of line is not limited thereto. For example, the line may include a line (hereinafter referred to as "timing line 420") connecting the plurality of driving elements 300.

The plurality of dimming blocks 200 may be arranged in a matrix form on the front surface of the substrate 112 of the light source device 100, and each of the plurality of dimming blocks 200 may include the plurality of light sources 111. The plurality of light sources 111 may be turned on by receiving all data signals, scan signals, and power signals.

The plurality of light sources 111 belonging to one dimming block 200 may be arranged in a matrix form on the front surface of the substrate 112.

According to an embodiment, the plurality of dimming blocks 200 included in two adjacent rows among the plurality of dimming blocks 200 may be electrically connected to the power line 410 extending between the two rows.

According to an embodiment, the power line may be efficiently arranged by arranging only one power line 410 between two rows.

In an embodiment, the plurality of driving elements 300 may be alternately arranged between adjacent columns in a matrix formed by the plurality of dimming blocks 200.

According to an embodiment, a length of the control line of the plurality of driving elements 300 may be reduced. In addition, according to an embodiment, because the control line of the plurality of driving elements 300 is alternately arranged between the columns of the plurality of dimming blocks 200, it is possible to secure a wiring passage between the columns of the plurality of dimming blocks 200.

According to an embodiment, a timing line 420 connecting the plurality of driving elements 300 arranged between the first and second columns and the plurality of driving elements 300 arranged in the third and fourth columns may be formed.

In an embodiment, the driving elements 300 disposed in different columns among the plurality of driving elements 300 may be electrically connected to each other through the timing line 420.

According to an embodiment, because each of the driving elements 300 is connected in series with the adjacent driving element 300 through the timing line 420, timing signals may be shared with each other and thus it is possible to reduce the number of data lines D1 and D2 and/or scan lines S.

FIG. 11 illustrates the line arrangement of the light source device 100 in which all of the above-described embodiments are combined. However, the light source device 100 according to an embodiment may include line arrangement implemented by each of the above-described embodiments, a combination of some of the above-described embodiments, or a combination of all of the above-described embodiments.

Figure 12:
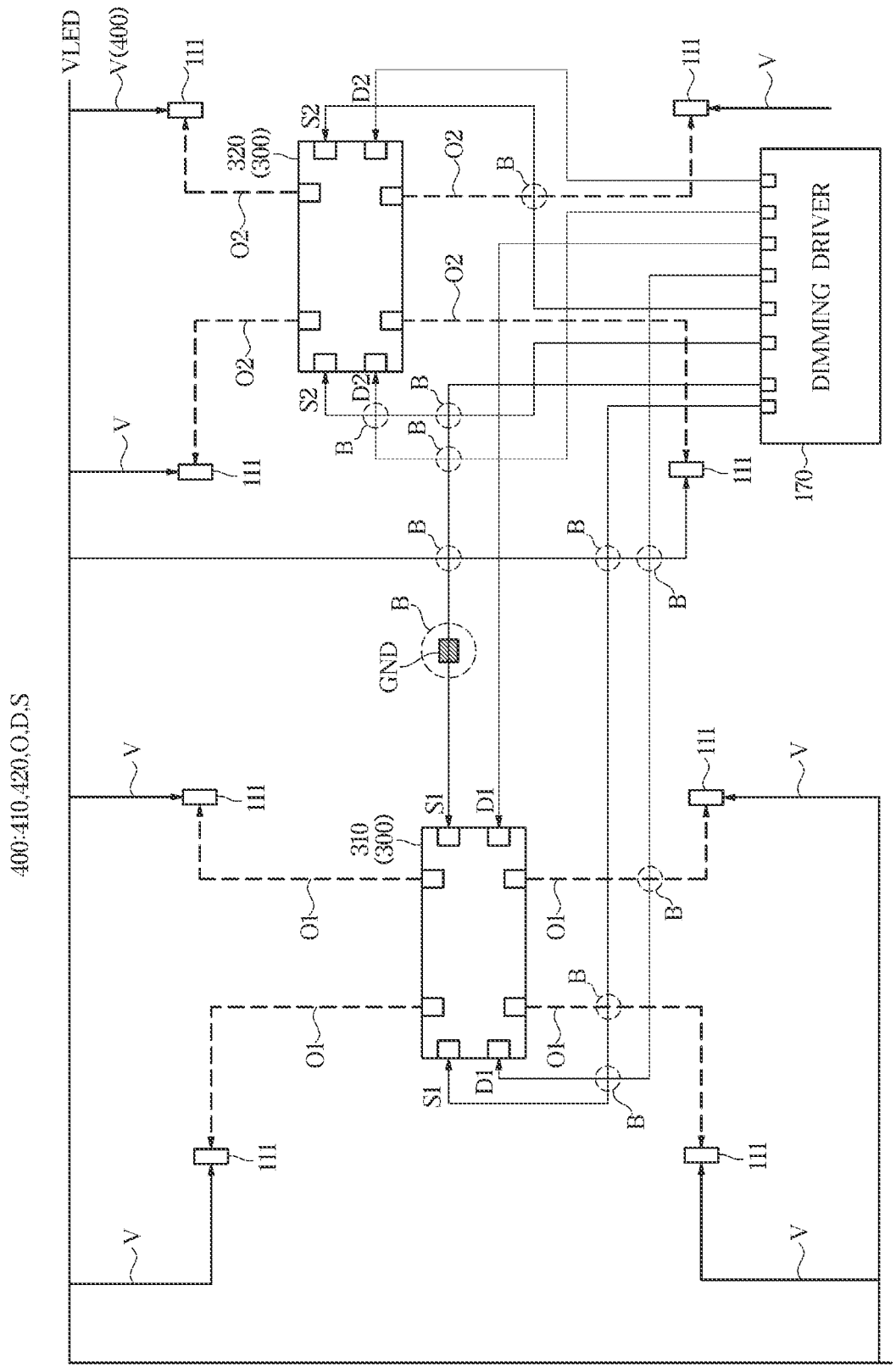
FIG. 12 illustrates an example of line arrangement on the substrate of the display apparatus according to an embodiment.

FIG. 12 illustrates an example of line arrangement on the substrate of the display apparatus according to an embodiment. FIG. 12 is a top view of the first side of the substrate 112. In other words, FIG. 12 illustrates components electrically connected to the first side of substrate 112. The first side of the substrate 112 may be a side facing the display panel 20 and the optical members 130 and 140.

Referring to FIG. 12, the display apparatus includes the driving element 300 and the line 400.

The driving element 300 may be provided in plurality. The driving element 300 may include a first driving element 310 and a second driving element 320.

The line 400 may be connected to the dimming driver 170, the first and second driving elements 310 and 320, and the light source 111 to transmit signals. The line 400 may transmit power from the dimming driver 170 including the connector to the light source 111 and the driving element 300.

The dimming driver 170 may be disposed on the light source substrate 112 or on a separate substrate other than the light source substrate 112.

The line 400 may include the data lines D1 and D2, the scan lines S, the power lines V, the timing lines 420, and out lines O. The line 400 may include at least a portion of the feeding pad 240. The line 400 may include various types of lines wired to the light source substrate 112, as well as the above-mentioned lines.

The data lines D1 and D2 may include a first data line D1 flowing from the dimming driver 170 to the first driving element 310, and a second data line D2 flowing from the dimming driver 170 to the second driving element 320. The first data line D1 and the second data line D2 may be provided in plurality.

The scan line S may include a first scan line S1 flowing from the dimming driver 170 to the first driving element 310, and a second scan line flowing from the dimming driver 170 to the second driving element 320. The first scan line S1 and the second scan line S2 may be provided in plurality.

The out line O may transmit a data signal from the driving element 300 to the light source 111. The number of out lines O may vary according to the scan signal and data signal flowing from the dimming driver 170 to the driving element 300.

The out line O may include a first out line O1 flowing from the first driving element 310 to the first light source 111, and a second out line O2 flowing from the second driving element 320 to the second light source 111.

The number of data lines D1 and D2, scan lines S, and out lines O is not limited to the above examples.

The line 400 may be disposed on one side of the substrate 112. For example, the line 400 may not be formed on both surfaces forming the outside of the substrate 112, but may be formed only on one side forming the outside of the substrate 112. For example, the line 400 may be provided on the first side of the substrate 112. The first side may be a side of the substrate 112 facing the display panel.

Because the line 400 is formed only on the first side of the substrate 112, the lines 400 may intersect each other (region B in FIG. 12). An intersection area between the lines 400 may be formed in plurality. For example, the data lines D1 and D2 for transferring a data signal from the dimming driver 170 to the driving element 300 may intersect the scan line S for transferring a scan signal from the dimming driver 170 to the driving element 300. The data lines D1 and D2 may intersect the power line V configured to supply power (driving voltage: VLED) to the light source 111 and the driving element 300. The scan line S may intersect the power line V. Further, the out line O may intersect one of the power line V, the scan line S, and the data lines D1 and D2.

For example, the first data line D1, the first scan line S1, and the power line V flowing to the first driving element 310 may intersect the first out line O1 flowing from the first driving element 310 to the first light source 111. Further, the second data line D2, the second scan line S, and the power line V flowing to the second driving element 320 may intersect the second out line O2 flowing from the second driving element 320 to the second light source 111. In addition, the line 400 connected to the first driving element 310 may intersect the line 400 connected to the second driving element 320.

When the lines 400 intersect, one of the lines 400 may be disconnected. Therefore, it is required to prevent the lines 400 from being disconnected so as to allow all lines to be electrically connected. Further, the line 400 may pass through the ground (GND) on one side of the substrate 112, and even in this case, it is required to prevent the disconnection of the line 400.

According to an embodiment, the display apparatus may include the jumper supporter 500. For example, the light source device 100 may include the jumper supporter 500. The jumper support 500 may be provided in plurality.

By using the jumper supporter 500, the display apparatus may prevent the disconnection of the line 400 while supporting the optical members 130 and 140. Because the jumper supporter 500 allows the line 400 provided on one side of the substrate 112 to intersect while supporting the optical members 130 and 140, it is possible to reduce the number of jumper connectors that is required for the intersection area between the lines 400. Therefore, by reducing the number of jumper connectors, it is possible to reduce costs and improve process efficiency.

The line 400 may include a first line, a second line, a third line, and a fourth line. In this case, the first line may be the data line D1 and D2, the second line may be the scan line S, the third line may be the power line V, and the fourth line may be the out line O. However, embodiments of the disclosure are not limited to the above example, and the first line may be referred to as a scan line S, a power line V, or an out line O, or may be referred to as another line. Further, the second line may be referred to as a data line D1 or D2, a power line V, or an out line O, or may be referred to as another line. Further, the third line may be referred to as a data line D1 or D2, a scan line S, or an out line O, or may be referred to as another line. Further, the fourth line may be referred to as a data line D1 or D2, a scan line S, or a power line V, or may be referred to as another line.

Various substrate components such as capacitors, resistors, and connectors as well as the line 400, the light source 111, and the driving element 300 may be disposed on the substrate 112. The line 400 may include all lines 400 for electrically connecting the light source 111, the driving element 300, the capacitor, the resistor, the connector, etc.

As for the substrate 112 of the display apparatus according to an embodiment, the various components described above may be disposed only on the first side facing the display panel 20 among the outer surfaces 251b and 252a, and thus it is possible to use the jumper supporter 500 to prevent the disconnection of the lines 400 configured to electrically connect the various components. Accordingly, there is no need to perform the process on both outer surfaces 251b and 252a of the substrate 112, and thus the process efficiency may be increased.

Figure 13:
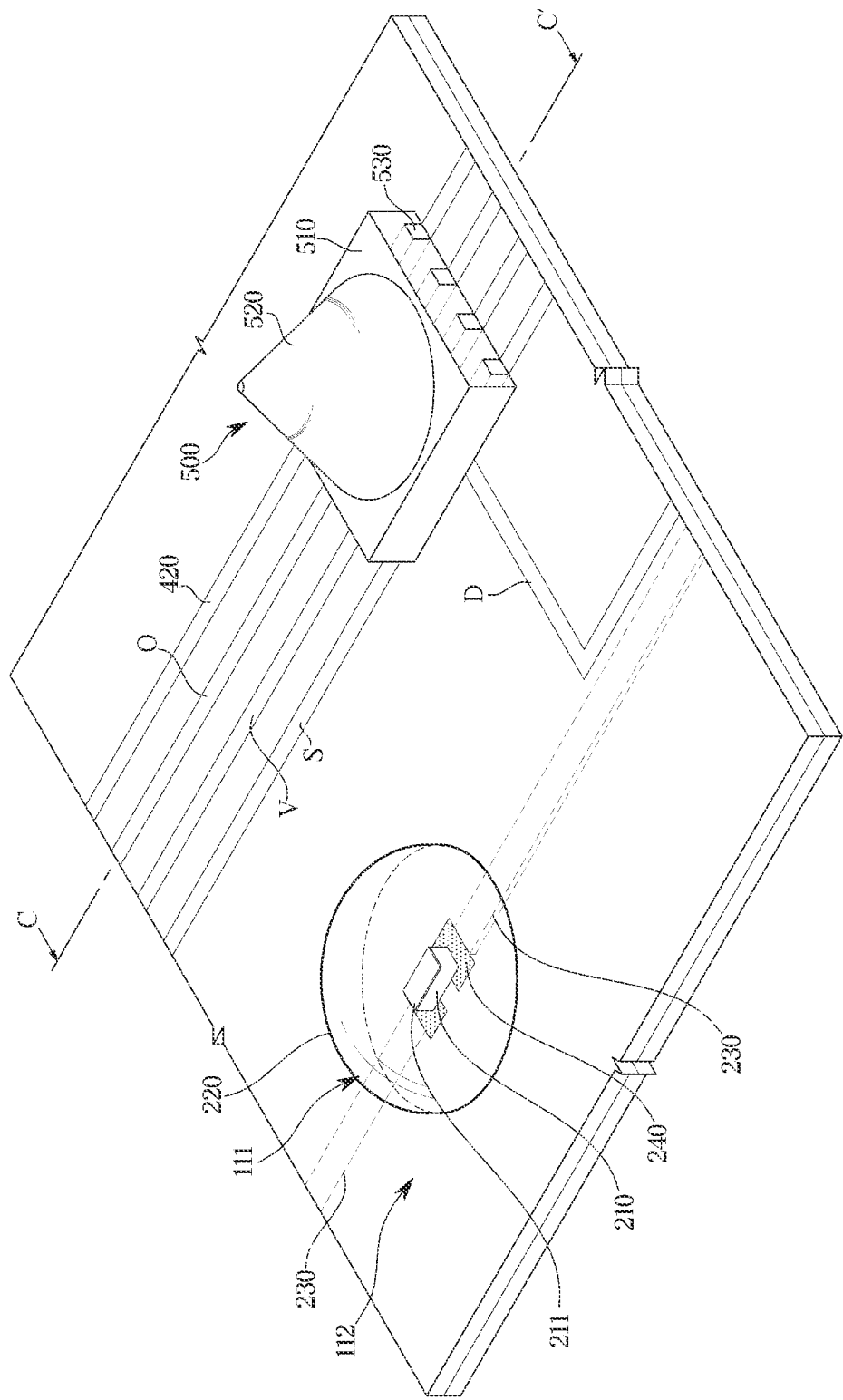
FIG. 13 is a view illustrating a jumper supporter being electrically connected to the substrate in the display apparatus according to an embodiment.
Figure 14:
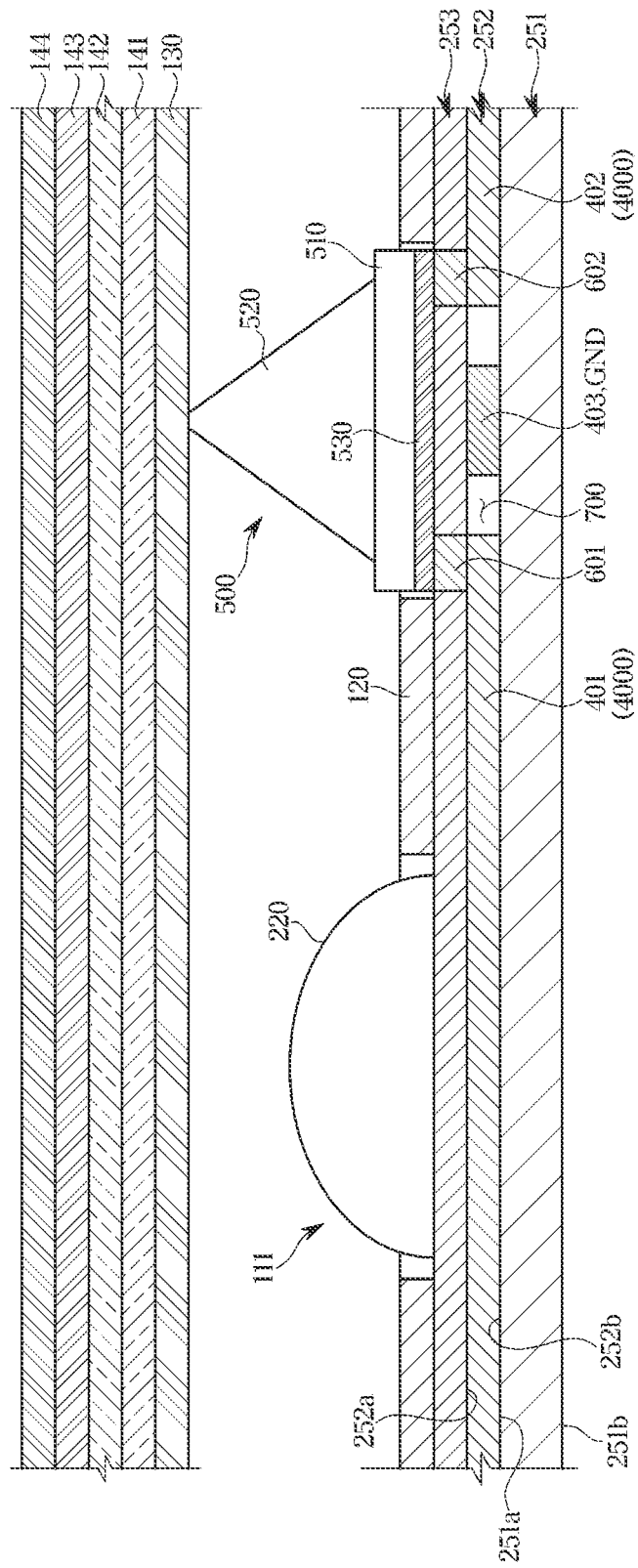
FIG. 14 is a cross-sectional view of the jumper supporter and the substrate shown in FIG. 13 taken along a direction C-C'.

FIG. 13 is a view illustrating a jumper supporter being electrically connected to the substrate in the display apparatus according to an embodiment. FIG. 14 is a cross-sectional view of the jumper supporter and the substrate shown in FIG. 13 taken along a direction C-C". The reflective sheet 120 is omitted in FIG. 13.

Referring to FIGS. 13 and 14, the display apparatus according to an embodiment includes the substrate 112 and the line 400 provided on the substrate 112.

The substrate 112 may include the insulation layer 251 and the conduction layer 252.

The substrate 112 may include a first side facing the display panel 20 and a second side opposite to the first side. The substrate 112 may include the plurality of outer surfaces provided on the outermost side. The outer surface of the substrate 112 may include the first surface 252a and the second surface 251b. The first surface 252a and the second surface 251b may be disposed on opposite sides. The first surface 252a may be the front surface of the substrate 112, and the second side 251b may be the rear surface of the substrate 112. The first surface 252a may be the front surface of the conduction layer 252, and the second surface 251b may be the rear surface of the insulation layer 251. The first surface 252a may be a side facing the display panel 20.

The line 400 may be part of conduction layer 252. The line 400 may be formed only on the first side of substrate 112. That is, in order to form the line 400, it is sufficient that the conduction layer 252 is formed on only one surface without being formed on both outer surfaces of the substrate 112. For example, the line 400 may be formed on the first surface 252a.

Because the lines 400 are wired only to the first side of the substrate 112, the lines 400 may intersect each other. When the lines 400 intersect each other, a single line 400 may be disconnected. The supporter 500 may be used to electrically connect the disconnected line 400.

The display apparatus according to an embodiment may include the supporter 500. The supporter 500 may be disposed on the substrate 112 to support the optical members 130 and 140. For example, the supporter 500 may be disposed on the first side of the substrate 112 facing the display panel 20 and the optical members 130 and 140.

The supporter 500 may be electrically connected to the substrate 112. The supporter 500 may allow circuit patterns, which intersect each other, to be connected without being disconnected. For example, the supporter 500 may be disposed in an area where one line 400 and other lines 400 intersect on the first side of the substrate 112, so as to electrically connect the one line 400 and to guide the other lines 400 to be spaced apart from the one line 400. The supporter 500 may be referred to as the jumper supporter 500.

Because the jumper supporter 500 allows the lines 400 provided on one side of the substrate 112 to intersect each other while supporting the optical members 130 and 140, it is possible to reduce the number of jumper connectors required on an intersection area between the lines 400. Therefore, by reducing the number of jumper connectors, it is possible to reduce costs and improve process efficiency.

As illustrated in FIG. 13, when the data line D intersects the scan line S, the power line V, the out line O, and the timing line 420, the jumper supporter 500 may allow each line to be connected without the disconnection.

However, the case in which the jumper supporter 500 connects the lines 400 is not limited to the above example. For example, when the scan line S intersects the data line D, the power line V, the out line O, and the timing line 420, the jumper supporter 500 may allow each line to be connected without the disconnection. Alternatively, when the power line V intersects the scan line S, the data line D, the out line O, and the timing line 420, the jumper supporter 500 may allow each line to be connected without the disconnection. Alternatively, when the out line O intersects the scan line S, the data line D, the power line V, and the timing line 420, the jumper supporter 500 may allow each line to be connected without the disconnection. Alternatively, when the timing line 420 intersects the scan line S, the data line D, the out line O, and the power line V, the jumper supporter 500 may allow each line to be connected without the disconnection.

Further, even when the scan line S and the power line V extend in a parallel direction, and the out line O and the data line D extend in a direction intersecting the scan line S and the power line V, the jumper supporter 500 may allow each line to be connected without the disconnection.

Further, even when only one line 400 intersects, the jumper supporter 500 may allow each line to be connected without the disconnection.

The line 400 may include the first portion 401 and the second portion 402, respectively. For example, each of the data line D, the scan line S, the power line V, and the out line line O may be divided into the first portion 401 and the second portion 402. The first portion 401 and the second portion 402 may be spaced apart from each other on the conduction layer 252 of the substrate 112. The jumper supporter 500 may electrically connect the first portion 401 and the second portion 402. For example, when the data line D is divided into a first portion 401 and a second portion 402, the jumper supporter 500 may electrically connect the first portion 401 and the second portion 402 and allow one of the scan line S, the power line V, and the out line O to be spaced apart from the data line D.

In the display apparatus according to an embodiment, the jumper supporter 500 may include a base 510 mounted on one surface of the substrate 112. For example, the base 510 may be disposed on the insulation layer 251 and the conduction layer 252. Although the base 510 is shown to have a substantially rectangular shape, the shape of the base 510 is not limited to thereto.

The jumper supporter 500 may further include a support portion 520. The support portion 520 may protrude from the base 510 to support the optical members 130 and 140. The support portion 520 may be formed to have a smaller cross-sectional area in a direction away from the base 510. For example, the support portion 520 may have a cone shape. However, the shape of the support portion 520 is not limited to thereto.

The base 510 and the support portion 520 may be formed integrally. When the base 510 and the support portion 520 are formed as one piece, the one piece may be referred to as a body.

The jumper supporter 500 may include a connection portion 530 connected to the conduction layer 252. The connection portion 530 may be connected to the circuit pattern and/or line 400 provided on the conduction layer 252. For example, the connection portion 530 may be electrically connected to the lines 400 connected to the driving element 300 and/or the light source 111.

The connection portion 530 may be formed adjacent to the conduction layer 252 to be soldered to the conduction layer 252. For example, the connection portion 530 may be formed on the base 510.

At least one connection portion 530 may be provided. The connection portion 530 may correspond to the number of lines 400 that intersect in the area where the jumper supporter 500 is disposed. For example, when the data line D intersects the scan line S, the power line V, the out line O, and the timing line 420, the jumper supporter 500 may be connected to the data line D or connected to the scan line S, the power line V, the out line O, and the timing line 420 so as to allow each line to be connected without the disconnection. As shown in FIG. 13, when the connection portion 530 is connected to the scan line S, the power line V, the out line O, and the timing line 420, four connection portions 530 may be provided.

The connection portion 530 may be soldered so as to be electrically connected to the conduction layer 252. For example, a first end of the connection portion 530 is connected to the first portion 401 of the disconnected line 400 through a first soldering portion 601, and a second end of the connection portion 530 may be connected to the second portion 402 of the disconnected line 400 through a second soldering portion 602.

The first soldering portion 601 may be provided on the first end side of the connection portion 530, and the second soldering portion 602 may be provided on the second end side of the connection portion 530. The first soldering portion 601 may electrically connect the first portion 401 and the connection portion 530, and the second soldering portion 602 may electrically connect the second portion 402 and the connection portion 530, thereby electrically connecting the first portion 401 and the second portion 402 which are disconnected.

When the jumper supporter 500 electrically connects the first portion 401 and the second portion 402 of the line 400, the jumper supporter 500 may be spaced apart from the substrate 112. For example, as the jumper supporter 500 and the insulation layer 251 are spaced apart from each other, a space 700 may be formed between the jumper supporter 500 and the insulation layer 251. The space 700 may be an area where the first portion 401 and the second portion 402 of the line 400 are disconnected.

When the lines 400 intersect each other (refer to FIGS. 12 and 13), one of the lines 400 may be electrically connected by the jumper supporter 500, and another one 403 of the lines 400 may be disposed in the space 700 formed between the supporter 500 and the insulation layer 251. Therefore, the one line and the another line 403 of the lines 400 may be wired without interfering with each other.

The jumper supporter 500 may be used in the relationship between the line 400 and the ground GND, as well as between the lines 400. For example, when the line 400 is wired to the substrate 112, the line 400 may not bypass the ground GND. At this time, the line 400 may bypass the ground GND through the jumper supporter 500.

In an embodiment, components including the line 400 and the ground GND may be formed only on the one surface 252a of the outer surfaces 252a and 251b of the substrate 112. Accordingly, there is no need to wire both outer surfaces 252a and 251b of the substrate 112, and the circuit only needs to be wired to the one surface 252a of the substrate 112, thereby improving process efficiency.

FIGS. 15 to 22 illustrate an arrangement relationship between lines in the display apparatus according to an embodiment. FIGS. 15 to 22 are enlarged views schematically illustrating a region "B" shown in FIG. 12.

Referring to FIG. 12, in the display apparatus according to an embodiment, the lines 400 are wired only to the first side of the substrate 112, and thus intersection may be generated between the lines 400. At this time, the jumper supporter 500 may allow the lines 400 to be connected without the disconnection. The display apparatus may include the jumper supporter 500. The jumper support 500 may be provided in plurality. The jumper support 500 may be disposed in each a region B, respectively.

Figure 15:
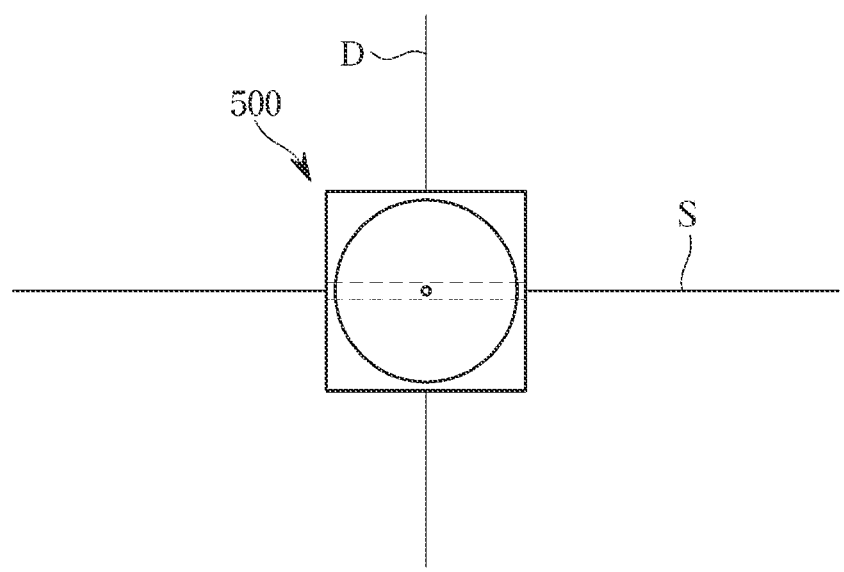
FIGS. 15 through 22 are enlarged views schematically illustrating a region "B" shown in FIG. 12 which illustrate an arrangement relationship between lines in the display apparatus according to an embodiment.

Referring to FIG. 15, the data line D may intersect the scan line S. At this time, as shown in FIG. 14, the scan line S may be composed of the first portion 401 and the second portion 402, and the first portion 401 and the second portion 402 may be connected through the jumper supporter 500. The scan line S may be wired to the jumper supporter 500. For example, the first portion 401 and the second portion 402 of the scan line S may be connected through the connection portion 530.

The data line D may be spaced apart from the scan line S. The data line D may pass through the space 700 between the jumper supporter 500 and the insulation layer 251. For example, because the jumper supporter 500 is disposed on the conduction layer 252, the space 700 may be formed between the jumper supporter 500 and the insulation layer 251, and the data line D may be wired to the space 700.

In this case, a jumper supporter 500 configured to connect the first portion 401 and the second portion 402 of the scan line S and provided to allow the data line D to pass between the insulation layer 251 and the jumper supporter 500 may be referred to as "first jumper supporter 500".

However, embodiments of the disclosure are not limited thereto. Accordingly, a jumper supporter 500 disposed in an area where the scan line S intersects the power line V, an area where the scan line S intersects the out line O, an area where the data line D intersects the power line V, an area where the data line D intersects the out line O, and/or an area where the power line V intersects the out line O may be referred to as "first jumper supporter 500".

Figure 16:
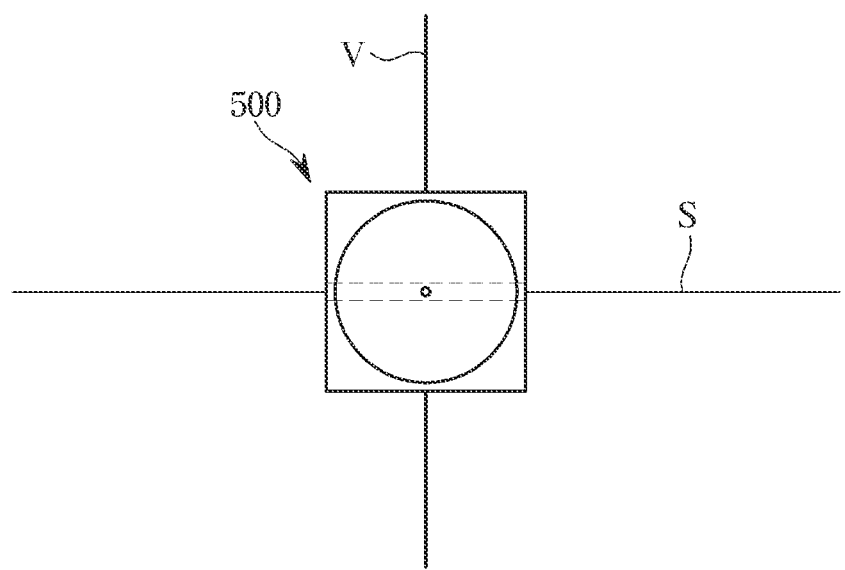

Referring to FIG. 16, the power line V may intersect the scan line S. At this time, the scan line S may be composed of the first portion 401 and the second portion 402, and the first portion 401 and the second portion 402 may be connected through the jumper supporter 500. The scan line S may be wired to the jumper supporter 500. For example, the first portion 401 and the second portion 402 of the scan line S may be connected through the connection portion 530.

As illustrated in FIG. 14, the power line V may pass through the space 700 between the jumper supporter 500 and the insulation layer 251. The power line V may be spaced apart from the scan line S.

In this case, a jumper supporter 500 configured to connect the first portion 401 and the second portion 402 of the scan line S and provided to allow the power line V to pass between the insulation layer 251 and the jumper supporter 500 may be referred to as "second jumper supporter 500".

However, embodiments of the disclosure are not limited thereto. Accordingly, a jumper supporter 500 disposed in an area where the scan line S intersects the data line D, an area where the scan line S intersects the out line O, an area where the data line D intersects the power line V, an area where the data line D intersects the out line O, and/or an area where the power line V intersects the out line O may be referred to as "second jumper supporter 500".

Figure 17:
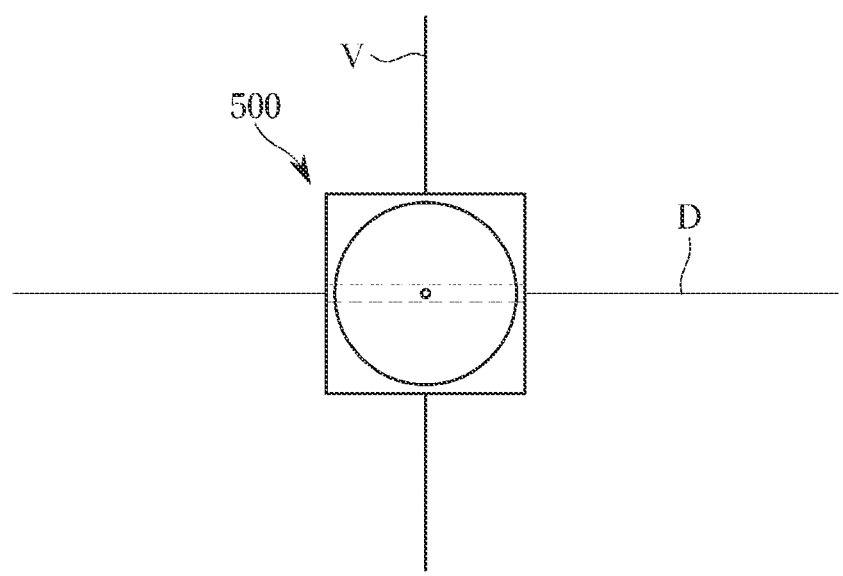

Referring to FIG. 17, the power line V may intersect the data line D. At this time, the data line D may be composed of the first portion 401 and the second portion 402, and the first portion 401 and the second portion 402 may be connected through the jumper supporter 500. The data line D may be wired to the jumper supporter 500. For example, the first portion 401 and the second portion 402 of the data line D may be connected through the connection portion 530.

As illustrated in FIG. 14, the power line V may pass through the space 700 between the jumper supporter 500 and the insulation layer 251. The power line V may be spaced apart from the data line D.

In this case, a jumper supporter 500 configured to connect the first portion 401 and the second portion 402 of the data line D and provided to allow the power line V to pass between the insulation layer 251 and the jumper supporter 500 may be referred to as "third jumper supporter 500".

However, embodiments of the disclosure are not limited thereto. Accordingly, a jumper supporter 500 disposed in an area where the scan line S intersects the data line D, an area where the scan line S intersects the out line O, an area where the scan line S intersects the power line V, an area where the data line D intersects the out line O, and/or an area where the power line V intersects the out line O may be referred to as "third jumper supporter 500".

Figure 18:
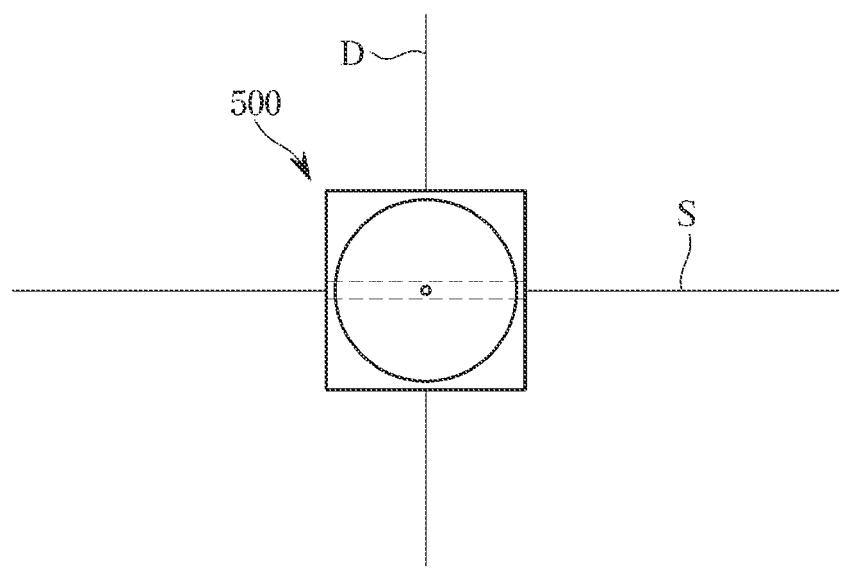

Referring to FIG. 18, the data line D may intersect the scan line S. At this time, the data line D may be composed of the first portion 401 and the second portion 402, and the first portion 401 and the second portion 402 may be connected through the jumper supporter 500. The data line D may be wired to the jumper supporter 500. For example, the first portion 401 and the second portion 402 of the data line D may be connected through the connection portion 530.

As illustrated in FIG. 14, the scan line S may pass through the space 700 between the jumper supporter 500 and the insulation layer 251. The scan line S may be spaced apart from the data line D.

In this case, a jumper supporter 500, which is shown in FIG. 18, configured to connect the first portion 401 and the second portion 402 of the data line D and provided to allow the scan line S to pass between the insulation layer 251 and the jumper supporter 500 may be referred to as "first jumper supporter 500" like the jumper supporter 500 of FIG. 15.

Figure 19:
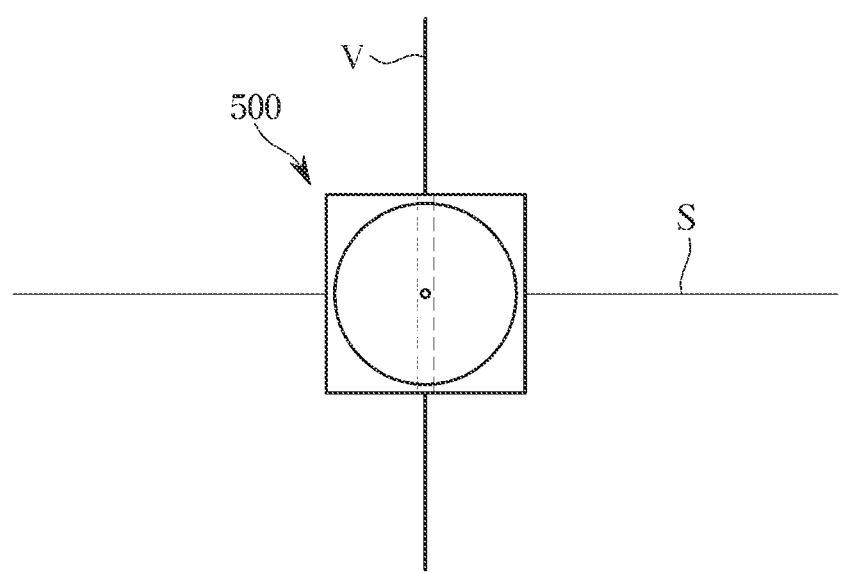

Referring to FIG. 19, the power line V may intersect the scan line S. At this time, the power line V may be composed of the first portion 401 and the second portion 402, and the first portion 401 and the second portion 402 may be connected through the jumper supporter 500. The power line V may be wired to the jumper supporter 500. For example, the first portion 401 and the second portion 402 of the power line V may be connected through the connection portion 530.

As illustrated in FIG. 14, the scan line S may pass through the space 700 between the jumper supporter 500 and the insulation layer 251. The scan line S may be spaced apart from the power line V.

In this case, a jumper supporter 500, which is shown in FIG. 19, configured to connect the first portion 401 and the second portion 402 of the power line V and provided to allow the scan line S to pass between the insulation layer 251 and the jumper supporter 500 may be referred to as "second jumper supporter 500" like the jumper supporter 500 of FIG. 16.

Figure 20:
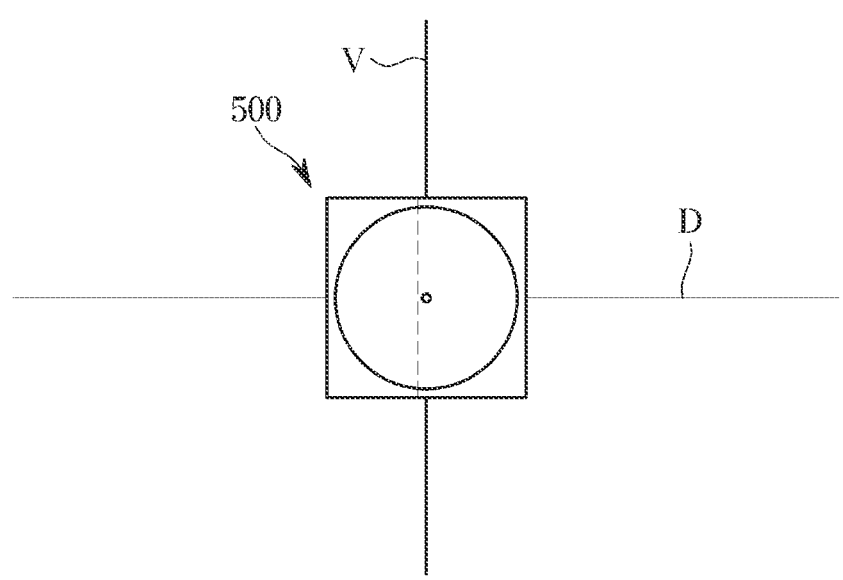

Referring to FIG. 20, the power line V may intersect the data line D. At this time, the power line V may be composed of the first portion 401 and the second portion 402, and the first portion 401 and the second portion 402 may be connected through the jumper supporter 500. The power line V may be wired to the jumper supporter 500. For example, the first portion 401 and the second portion 402 of the power line V may be connected through the connection portion 530.

As illustrated in FIG. 14, the data line D may pass through the space 700 between the jumper supporter 500 and the insulation layer 251. The data line D may be spaced apart from the power line V.

In this case, a jumper supporter 500, which is shown in FIG. 20, configured to connect the first portion 401 and the second portion 402 of the power line V and provided to allow the data line D to pass between the insulation layer 251 and the jumper supporter 500 may be referred to as "third jumper supporter 500" like the jumper supporter 500 of FIG. 17.

Figure 21:
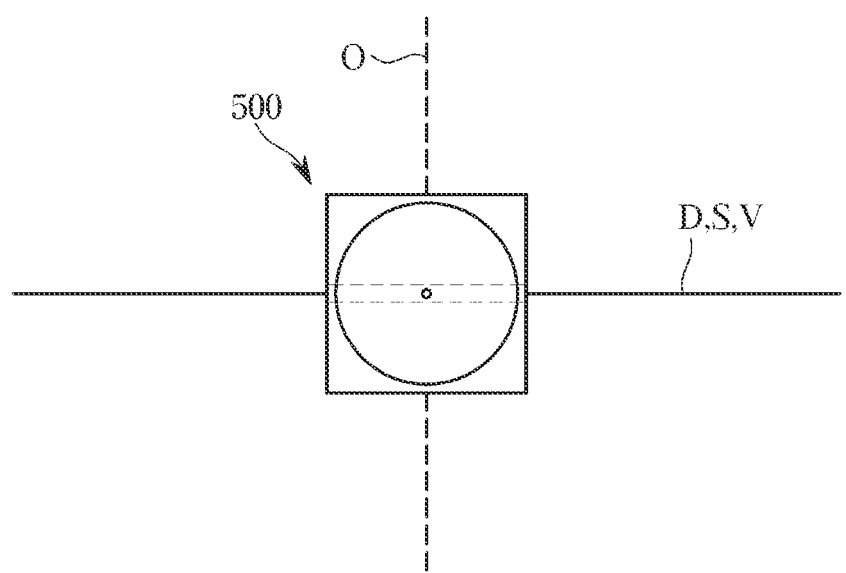

Referring to FIG. 21, the out line O may intersect one of the data line D, the scan line S, and the power line V. One of the data line D, the scan line S, and the power line V may be composed of the first portion 401 and the second portion 402, and the first portion 401 and the second portion 402 may be connected through the jumper supporter 500. One of the data line D, the scan line S, and the power line V may be wired to the jumper supporter 500. For example, the first portion 401 and the second portion 402 of one of the data line D, the scan line S, and the power line V may be connected through the connection portion 530.

As illustrated in FIG. 14, the out line O may pass through the space 700 between the jumper supporter 500 and the insulation layer 251. The out line O may be spaced apart from one of the data line D, the scan line S, and the power line V.

In this case, a jumper supporter 500 configured to connect the first portion 401 and the second portion 402 of one of the data line D, the scan line S, and the power line V and provided to allow the data line D to pass between the insulation layer 251 and the jumper supporter 500 may be referred to as "fourth jumper supporter 500".

Figure 22:
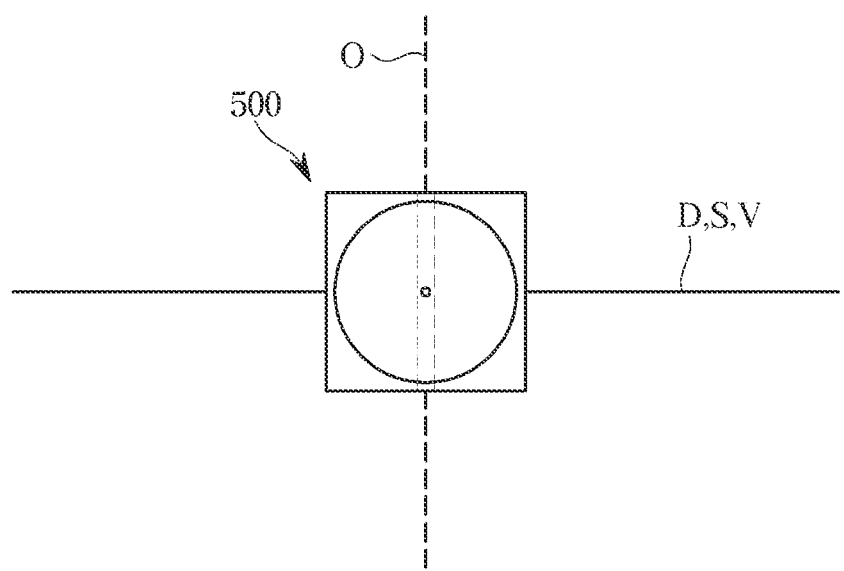

Referring to FIG. 22, one of the data line D, the scan line S, and the power line V may intersect the out line O. The out line O may be composed of the first portion 401 and the second portion 402, and the first portion 401 and the second portion 402 may be connected through the jumper supporter 500. The out line O may be wired to the jumper supporter 500. For example, the first portion 401 and the second portion 402 of the out line O may be connected through the connection portion 530.

As illustrated in FIG. 14, one of the data line D, the scan line S, and the power line V may pass through the space 700 between the jumper supporter 500 and the insulation layer 251. One of the data line D, the scan line S, and the power line V may be spaced apart from the out line O.

In this case, a jumper supporter 500, which is shown in FIG. 22, configured to connect the first portion 401 and the second portion 402 of the out line O and provided to allow one of the data line D, the scan line S, and the power line V to pass between the insulation layer 251 and the jumper supporter 500 may be referred to as "fourth jumper supporter 500" like the jumper supporter 500 of FIG. 21.

The timing line 420 may intersect one of the out line O, the power line V, the scan line S, and the data line D. However, the jumper supporter 500 may be used in the case in which the timing line 420 intersects one of the out line O, the power line V, the scan line S, and the data line D.

In addition, a jumper supporter 500 may be disposed in an area where a plurality of parallel lines 400 intersects a plurality of lines 400 that intersects the plurality of parallel lines 400, so as to allow the lines 400 to be connected without the disconnection between the lines 400.

The display apparatus according to an embodiment may include the display panel 20 and the light source device 100 configured to provide light to the display panel.

In the display apparatus according to an embodiment, the light source device 100 may include the optical members 130 and 140, the substrate 112 including the first side facing the display panel and the optical members, the light source 111 disposed on the first side of the substrate, the driving element 300 disposed on the first side of the substrate to drive the light source, the line 400 disposed on the first side of the substrate and including the first line 410, 420, S. D. and O and the second line 410, 420. S, D, and O connected to the driving element, and the jumper supporter 500 disposed on the first side of the substrate and configured to support the optical members 130 and 140.

In the display apparatus according to an embodiment, the jumper supporter 500 may be disposed on an area where the first line 410, 420. S, D or O intersects the second line 410, 420, S, D, or O to electrically connect the first line 410, 420, S, D or O and to guide the second line 410, 420, S, D, or O to be spaced apart from the first line 410, 420, S, D, or O.

In the display apparatus according to an embodiment, the substrate 112 may include the insulation layer 251 including the first side facing the optical members, and the conduction layer 252 laminated on the first side of the insulation layer and including the first side facing the optical members.

In the display apparatus according to an embodiment, the jumper supporter 500 may be soldered to the conduction layer 252 on the first side of the conduction layer 252 to electrically connect the first line.

In the display apparatus according to an embodiment, the jumper supporter 500 may include the base 510 disposed on the conduction layer, the support portion 520 protruded from the base to support the optical members, and the connection portion 530 formed on the base to electrically connect the first line.

In the display apparatus according to an embodiment, the first line 410, 420, S. D, and O may include the first portion 401 and the second portion 402 disconnected from the first portion. The connection portion 530 of the jumper supporter may connect the first portion 401 and the second portion 402.

In the display apparatus according to an embodiment, the second line 410, 420. S, D, and O may be disposed between the insulation layer 251 and the base 510 of the jumper supporter.

In the display apparatus according to an embodiment, the line may include the scan line S configured to provide a scan signal to the driving element, the data line D configured to provide a data signal to the driving element, the power line V and 410 configured to provide a power signal to the light source, and the out line O configured to provide a signal from the driving element to the light source.

In the display apparatus according to an embodiment, the jumper supporter 500 may be the first jumper supporter 500 disposed in an area where the scan line S intersects the data line D.

In the display apparatus according to an embodiment, the scan line S may be the first line electrically connected by the first jumper supporter 500, and the data line D may be the second line spaced apart from the first line by the first jumper supporter 500.

In the display apparatus according to an embodiment, the light source device may include the second jumper supporter 500 disposed in an area where the power line V or 410 intersects the scan line S.

In the display apparatus according to an embodiment, the scan line S may be the first line electrically connected by the second jumper supporter 500 and the power line V or 410 may be the second line spaced apart from the first line by the second jumper supporter 500.

In the display apparatus according to an embodiment, the light source device 100 may include the third jumper supporter disposed in an area where the power line V or 410 intersects the data line D.

In the display apparatus according to an embodiment, the data line D may be the first line electrically connected by the third jumper supporter 500, and the power line V or 410 may be the second line spaced apart from the first line by the third jumper supporter 500.

In the display apparatus according to an embodiment, the light source device 100 may further include the fourth jumper supporter 500 disposed in an area where the out line O) intersects at least one of the data line D, the scan line S and the power line V or 410.

In the display apparatus according to an embodiment, the out line O may be the first line electrically connected by the fourth jumper supporter 500 and the one of the data line D, the scan line S and the power line V or 410 may be a second line spaced apart from the first line by the fourth jumper supporter 500.

The display apparatus according to an embodiment may further include the dimming driver 170 configured to transmit the scan signal, the data signal, and the power signal to the driving element.

The display apparatus according to an embodiment may include the display panel 20 and the light source device 100 configured to provide light to the display panel.

In the display apparatus according to an embodiment, the light source device 100 may include the light source Ill facing the display panel, the driving element 300 configured to supply a driving signal to the light source, the substrate 112 including the insulation layer 251 and the conduction layer 252 laminated on the insulation layer and soldered to the light source and the driving element, the line 400 disposed on the conduction layer and including the first line 410, 420, S, D, and O and the second line 410, 420, S, D, and O connected to the driving element, the optical members 130 and 140 disposed between the display panel and the substrate, and the jumper supporter 500 provided to support the optical members and disposed on an area where the first line 410, 420, S, D or O intersects the second line 410, 420, S, D, or O.

In the display apparatus according to an embodiment, the jumper supporter 500 may be configured to electrically connect the first line, and the second line may be spaced apart from the insulation layer 251 to be disposed between the jumper supporter 500 and the insulation layer 251.

In the display apparatus according to an embodiment, the driving element 300 may include the first driving element 310 and the second driving element 320 configured to receive the scan signal, the data signal, and the power signal, respectively, from the dimming driver.

In the display apparatus according to an embodiment, the jumper supporter 500 may be disposed in an area where at least one of the scan line S1 and the data line D1 connected to the first driving element 310 intersects at least one of the scan line S2 and the data line D2 connected to the second driving element 320.

In the display apparatus according to an embodiment, the first line may be disconnected and divided into the first portion 401 and the second portion 402. The first portion and the second portion may be electrically connected through the jumper supporter 500.

In the display apparatus according to an embodiment, the jumper supporter 500 may include the base 510 disposed on the conduction layer, the support portion 520 protruding from the base to support the optical members, and the connection portion 530 formed on the base to electrically connect the first line.

In the display apparatus according to an embodiment, the second line may be disposed between the insulation layer 251 and the base 510 of the jumper supporter 500.

The display apparatus according to an embodiment may include the display panel 20 and the light source device 100 configured to provide light to the display panel.

In the display apparatus according to an embodiment, the light source device 100 may include the optical members 130 and 140, the substrate 112 including the first side facing the display panel and the optical members, the light source 111 disposed on the first side, the driving element 300 disposed on the first side to provide a driving signal to the light source, the line 400 disposed on the first side and including the scan line S configured to provide a scan signal to the driving element, the data line D configured to provide a data signal to the driving element, the power line V or 410 configured to provide a power signal to the light source, and the out line O configured to provide a signal from the driving element to the light source, and the jumper supporter 500 provided to support the optical members 130 and 140 disposed on an area where one of the lines 400 intersects another one of the lines 400 on the first side.

In the display apparatus according to an embodiment, the jumper supporter 500 may be configured to electrically connect the one of the lines 400 and configured to guide the another one of the lines 400 to be spaced apart from the one of the lines.

The jumper supporter 500 may allow the intersection between the lines 400 arranged on one surface of the substrate 112 while supporting the optical members 130 and 140. Therefore, it is possible to reduce the number of jumper connectors that is required in the intersection area between the lines 400. Further, it is possible to reduce the costs and improve the process efficiency due to the reduction in the number of jumper connectors.

While the present disclosure has been particularly described with reference to exemplary embodiments, it should be understood by those of skilled in the art that various changes in form and details may be made without departing from the spirit and scope of the present disclosure.

What is claimed is:

1. A display apparatus comprising:
a display panel; and
a light source device configured to provide light to the display panel,
wherein the light source device comprises:
an optical member;
a substrate comprising a first side facing the display panel and the optical member;
a light source provided on the first side of the substrate;
a driving element provided on the first side of the substrate and configured to drive the light source;
a plurality of lines provided on the first side of the substrate, the plurality of lines comprising a first line and a second line that are connected to the driving element; and
a jumper supporter provided on the first side of the substrate in an area where the first line intersects the second line, the jumper supporter being configured to support the optical member, to electrically connect the first line, and to guide the second line to be spaced apart from the first line.

2. The display apparatus of claim 1, wherein the substrate comprises:
an insulation layer comprising a first side facing the optical member; and
a conduction layer laminated on the first side of the insulation layer and comprising a first side facing the optical member, and
wherein the jumper supporter is soldered to the first side of the conduction layer to electrically connect the first line.

3. The display apparatus of claim 2, wherein the jumper supporter comprises:
a base provided on the conduction layer;
a support portion protruded from the base and configured to support the optical member; and
a connection portion provided on the base to electrically connect the first line.

4. The display apparatus of claim 3, wherein the first line comprises:
a first portion; and
a second portion disconnected from the first portion, and
wherein the connection portion of the jumper supporter connects the first portion and the second portion.

5. The display apparatus of claim 4, wherein the second line is between the insulation layer and the base of the jumper supporter.

6. The display apparatus of claim 1, wherein the plurality of lines further comprises:
   a scan line configured to provide a scan signal to the driving element;
   a data line configured to provide a data signal to the driving element;
   a power line configured to provide a power signal to the light source; and
   an out line configured to provide a signal from the driving element to the light source.

7. The display apparatus of claim 6, wherein the jumper supporter is a first jumper supporter provided in an area where the scan line intersects the data line.

8. The display apparatus of claim 7, wherein the first line is the scan line; and
   wherein the second line is the data line.

9. The display apparatus of claim 7, wherein the light source device further comprises a second jumper supporter provided in an area where the power line intersects the scan line.

10. The display apparatus of claim 9, wherein the scan line is electrically connected by the second jumper supporter; and
    wherein the power line is spaced apart from the scan line by the second jumper supporter.

11. The display apparatus of claim 9, wherein the light source device further comprises a third jumper supporter provided in an area where the power line intersects the data line.

12. The display apparatus of claim 11, wherein the data line is electrically connected by the third jumper supporter; and
    wherein the power line is spaced apart from the data line by the third jumper supporter.

13. The display apparatus of claim 11, wherein the light source device further comprises a fourth jumper supporter provided in an area where the out line intersects at least one of the data line, the scan line and the power line.

14. The display apparatus of claim 13, wherein the out line is electrically connected by the fourth jumper supporter; and
    wherein at least one of the data line, the scan line and the power line is spaced apart from the out line by the fourth jumper supporter.

15. The display apparatus of claim 6, further comprising:
    a dimming driver configured to transmit the scan signal, the data signal, and the power signal to the driving element,
    wherein the driving element comprises a first driving element and a second driving element, and the first driving element and the second driving element are respectively configured to receive the scan signal, the data signal, and the power signal from the dimming driver,
    wherein the scan line comprises a first scan line connected to the first driving element and a second scan line connected to the second driving element,
    wherein the data line comprises a first data line connected to the first driving element and a second data line connected to the second driving element, and
    wherein the jumper supporter is provided in an area where at least one of the first scan line and the first data line intersects at least one of the second scan line and the second data line.

16. A light source device comprising:
    an optical member;
    a substrate comprising a first side facing the optical member;
    a light source provided on the first side of the substrate;
    a driving element provided on the first side of the substrate and configured to drive the light source;
    a plurality of lines provided on the first side of the substrate, wherein the plurality of lines comprises a first line and a second line that are connected to the driving element; and
    a jumper supporter provided on the first side of the substrate in an area where the first line intersects the second line, the jumper supporter being configured to support the optical member, to electrically connect the first line, and to guide the second line to be spaced apart from the first line.

17. The light source device of claim 16, wherein the first line comprises a first portion and a second portion,
    wherein the substrate comprises:
       an insulation layer comprising a first side facing the optical member; and
       a conduction layer laminated on the first side of the insulation layer and comprising a first side facing the optical member, and
    wherein the jumper supporter is electrically connected to the first side of the conduction layer and electrically connects the first portion of the first line and the second portion of the first line.

18. The light source device of claim 17, wherein the jumper supporter comprises:
    a base provided on the conduction layer;
    a support portion protruded from the base and configured to support the optical member; and
    a connection portion provided on the base, and
    wherein the connection portion of the jumper supporter connects the first portion of the first line to the second portion of the first line.

19. The light source device of claim 18, wherein the second line is between the insulation layer and the base of the jumper supporter.

20. The light source device of claim 16, wherein the plurality of lines further comprises a plurality of first lines which includes the first line,
    wherein each first line of the plurality of first lines comprises a first portion and a second portion,
    wherein the substrate comprises:
       an insulation layer comprising a first side facing the optical member; and
       a conduction layer laminated on the first side of the insulation layer and comprising a first side facing the optical member,
    wherein the jumper supporter comprises:
       a base provided on the conduction layer;
       a support portion protruded from the base and configured to support the optical member; and
       a plurality of connection portions provided on the base,
    wherein each connection portion of the plurality of connection portions corresponds to a respective first line of the plurality of first lines, and each connection portion of the plurality of connection portions connects the first portion and the second portion of the respective first line corresponding to the connection portion, and
    wherein the jumper supporter is further configured to guide the second line to be spaced apart from each first line of the plurality of first lines.

* * * * *